United States Patent
Kurachi

(10) Patent No.: US 8,755,917 B2
(45) Date of Patent: Jun. 17, 2014

(54) SAFETY CONTROL DEVICE

(75) Inventor: Haruyuki Kurachi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1020 days.

(21) Appl. No.: 12/739,109

(22) PCT Filed: Nov. 7, 2008

(86) PCT No.: PCT/JP2008/070340
§ 371 (c)(1),
(2), (4) Date: Apr. 21, 2010

(87) PCT Pub. No.: WO2009/060953
PCT Pub. Date: May 14, 2009

(65) Prior Publication Data
US 2010/0234968 A1    Sep. 16, 2010

(30) Foreign Application Priority Data
Nov. 7, 2007  (JP) .................................. 2007-289448

(51) Int. Cl.
*G05B 19/048*  (2006.01)
*G05B 9/00*  (2006.01)

(52) U.S. Cl.
USPC ................................ 700/79; 700/21; 700/177

(58) Field of Classification Search
CPC ..... G05B 9/00; G05B 19/0428; G05B 19/048
USPC .................................. 700/12, 21, 54, 79, 177
See application file for complete search history.

(56) References Cited

U.S. PATENT DOCUMENTS

| | | | |
|---|---|---|---|
| 5,638,510 A | 6/1997 | Ishikawa | |
| 6,330,701 B1 | 12/2001 | Rosendahl et al. | |
| 7,210,222 B2 * | 5/2007 | Izumida et al. ................. | 29/832 |
| 7,440,932 B2 | 10/2008 | Gartland et al. | |
| 2005/0080492 A1 | 4/2005 | Shimamura et al. | |
| 2008/0215913 A1 | 9/2008 | Terayama et al. | |
| 2009/0106461 A1 | 4/2009 | Terayama et al. | |
| 2009/0149970 A1 * | 6/2009 | Miyamoto et al. .............. | 700/45 |

(Continued)

FOREIGN PATENT DOCUMENTS

| | | | |
|---|---|---|---|
| JP | 56-067458 A | 6/1981 | |
| JP | 59-043450 A | 3/1984 | |

(Continued)

OTHER PUBLICATIONS

Notice of Rejection issued in corresponding Japanese Patent Application No. 2009-540101, dated Jun. 14, 2011.

(Continued)

*Primary Examiner* — Ronald Hartman, Jr.
(74) *Attorney, Agent, or Firm* — Sughrue Mion, PLLC

(57) ABSTRACT

To obtain a safety control device capable of shortening a response time without using a high-speed CPU, command judging units judge whether an output command that has been input is an ON command or an OFF command; comparing units transmit a judgment result of their command judging units to each other and compare the judgment results of the command judging units with each other. Output units output an output signal to turn off a switch if the judgment result of the command judging units is the OFF command or if the comparison result of the comparing units indicates disagreement.

8 Claims, 16 Drawing Sheets

(56) References Cited

U.S. PATENT DOCUMENTS

| | | | |
|---|---|---|---|
| 2009/0319057 A1* | 12/2009 | Miki | 700/13 |
| 2010/0217428 A1* | 8/2010 | Strong et al. | 700/117 |
| 2012/0310391 A1* | 12/2012 | Sanders | 700/94 |

FOREIGN PATENT DOCUMENTS

| | | |
|---|---|---|
| JP | 03-286340 A | 12/1991 |
| JP | 6051136 A | 2/1994 |
| JP | 06-149604 A | 5/1994 |
| JP | 11-183546 A | 7/1999 |
| JP | 2000-172517 A | 6/2000 |
| JP | 2001-526422 A | 12/2001 |
| JP | 2005-115795 A | 4/2005 |
| JP | 2005-227873 A | 8/2005 |
| JP | 2006-209197 A | 8/2006 |
| JP | 2006-209565 A | 8/2006 |
| JP | 2006-260038 A | 9/2006 |
| KR | 10-0626411 B1 | 9/2006 |
| KR | 10-0745529 B1 | 8/2007 |

OTHER PUBLICATIONS

Korean Office Action, dated Nov. 28, 2011.
Japanese Decision of a Patent Grant, dated Jul. 26, 2012.
Korean Decision of a Patent Grant, dated Jul. 26, 2012.

* cited by examiner

FIG.3

| JUDGMENT RESULT | | OUTPUT SIGNAL | |
|---|---|---|---|
| A-BLOCK PROCESSING UNIT | B-BLOCK PROCESSING UNIT | A-BLOCK PROCESSING UNIT | B-BLOCK PROCESSING UNIT |
| ON | ON | ON | ON |
| ON | OFF | OFF | OFF |
| OFF | ON | OFF | OFF |
| OFF | OFF | OFF | OFF |

US 8,755,917 B2

SAFETY CONTROL DEVICE

TECHNICAL FIELD

The present invention relates to a safety control device including one or more processing units that each exercise control over whether to cause a target device to perform a safety operation or to permit the target device to operate, based on an output command that is input from outside. In particular, the present invention relates to a safety control device that is able to shorten a response time to output an instruction to cause the safety operation.

BACKGROUND ART

In control systems for devices such as robots in factory automations (FA), safety is important, and it is necessary to stop the devices when anomaly is detected. If the systems are operating properly, it is possible to stop the devices by outputting commands to stop the operations to the devices. However, if anomaly occurs in the systems, even if the commands to stop the operations are output to the devices, it is not certain whether the instructions will be properly executed. Safety control devices are thus sometimes used to control switches that connect the devices to electric power sources, to stop supply of power to the devices by turning off the switches and forcibly stop the operations of the devices.

Generally, safety control devices are configured to perform dual judging of commands input from the outside. If the two judgment results agree with each other, the safety control devices exercise control based on the input command. If the two judgment results do not agree with each other, the safety control devices exercise safety control (i.e., to stop the devices in these situations) to improve the safety.

The performance of a safety control device is determined by the response time between a time point at which safety can no longer be confirmed and a time point at which a device is stopped. Thus, shortening a processing time period between reception of a command and output of an output signal to stop the device leads to improvement in the performance of the safety control device.

An example of a conventional technique to increase the speed of the dual control process is disclosed in Patent Document 1. In Patent Document 1, the technique in a dual control apparatus having two multi-processor-type controlling devices disposed in parallel is disclosed, in which functions of computing controllers and input/output controllers are distributed among different CPU elements, and input/output data comparing processes performed by the dual input/output controllers are performed concurrently with data transfer, so that detection of disagreement between the two systems is performed in a short period of time.

Patent Document 1: Japanese Patent Application Laid-open No. S59-43450

DISCLOSURE OF INVENTION

Problem to be Solved by the Invention

According to the conventional technique disclosed in Patent Document 1 described above, the computing controller of one of the CPUs transmits a computation result to the input/output controller of the one of the CPUs and to the input/output controller of the other one of the CPUs, and the computation controller of the other one of the CPUs transmits a computation result to the input/output controller of the other one of the CPUs and to the input/output controller of the one of the CPUs. Consequently, it is possible to make the communication time period shorter as compared to a case where each computing controller transmits a computation result to an input/output controller of a CPU to which the computing controller belongs and the input/output controllers transmit the computation results to each other.

If the conventional technique disclosed in Patent Document 1 described above is applied to a safety control device, the computing controllers correspond to a command judging unit that makes a judgment on a command, and the input/output controllers correspond to a comparing unit that compares the judgment results. In this case, the response time of the safety control device is equal to the sum of a judging process period required for a command judging unit to perform a judging process on the command; a communication process period required for the command judging unit to perform a communication process of transmitting the judgment result to each comparing unit; and a comparing process period required for the comparing unit to perform a comparing process of comparing the judgment results.

If the conventional technique disclosed in document 1 described above is applied to a safety control device, however, the judging process, the communication process, and the comparing process must be always performed. Thus, it is difficult to shorten the response time further. To solve this problem, using CPUs with higher processing performance may be considered, but the cost will be increased. In addition, because the communication process involves communications between the CPUs, the processing load is larger than that of the judging process and the comparing process, which are performed within the CPUs. Accordingly, the communication process period is a factor that determines the response time.

The present invention has been made in view of the above, and it is an object of the present invention to obtain a safety control device that is able to shorten the response time, without having to use high-speed CPUs.

Means for Solving Problem

A safety control device according to an aspect of the invention includes a plurality of processing units that control whether to cause a target device to perform a safety operation or to permit the target device to operate, based on an output command that is input from outside, each of the plurality of processing units including: a command judging unit that judges whether the output command is a safety operation command or an operation permitting command; a comparing unit that transmits a judgment result of the command judging unit to another one of the plurality of processing units, receives a judgment result from the another one of the plurality of processing units, and compares the judgment result received from the another one of the plurality of processing units and the judgment result of the command judging unit to check whether all of the judgment results agree with each another; and an output unit that outputs an output signal to cause the target device to perform the safety operation if the judgment result of the command judging unit is the safety operation command or if a comparison result of the comparing unit indicates disagreement and that outputs an output signal to permit the target device to operate if the judgment result of the command judging unit is the operation permitting command and the comparison result of the comparing unit indicates agreement.

Effect of the Invention

According to an aspect of the present invention, the plurality of command judging units judge whether the output command that is input from the outside is the safety operation command or the operation permitting command, and if it is judged that at least one of the judgment results is the safety operation command, even if the judgment result from the other command judging unit is the operation permitting command, the judgment results indicate the disagreement and the output signal to cause the device to perform the safety operation is output. Accordingly, if the judgment result is the safety operation command, the output signal to cause the device to perform the safety operation is output without comparing the judgment result with the judgment result from the other command judging unit. Thus, an effect of being able to obtain a safety control device having higher performance with shortened response time, without having to use high-performance CPUs to increase the speed of communicating the judgment results and the comparing process.

BRIEF DESCRIPTION OF DRAWINGS

FIG. 3 is a table of relationships between judgment results and output signals.

EXPLANATIONS OF LETTERS OR NUMERALS

1$a$, 1$b$ Command receiving unit
2$a$, 3$a$, 4$a$, 5$a$ A-block processing unit
2$b$, 3$b$, 4$b$, 5$b$ B-block processing unit
21$a$, 21$b$ Command judging unit
22$a$, 22$b$ Comparing unit
23$a$, 23$b$ Serial driver
24$a$, 24$b$ Output unit
25$a$, 33$a$, 54$a$, 25$b$, 33$b$, 54$b$ Abnormality processing unit
31$a$, 51$a$, 31$b$, 51$b$ Timer
32$a$, 41$a$, 52$a$, 32$b$, 41$b$, 52$b$ Dark test performing unit
53$a$, 53$b$ Malfunction diagnosis performing unit
70$a$ Electric power source
80 Control remote I/O station
81$a$, 81$b$ Device
82 Safety remote I/O station
90 Remote master station
91 Network
SW1$a$, SW1$b$, SW2$a$, SW2$b$ Switch

BEST MODE(S) FOR CARRYING OUT THE INVENTION

In the following sections, exemplary embodiments of a safety control device according to the present invention will be explained in detail, with reference to the accompanying drawings. The present invention is not limited to these exemplary embodiments.

First Embodiment

Figure 1:
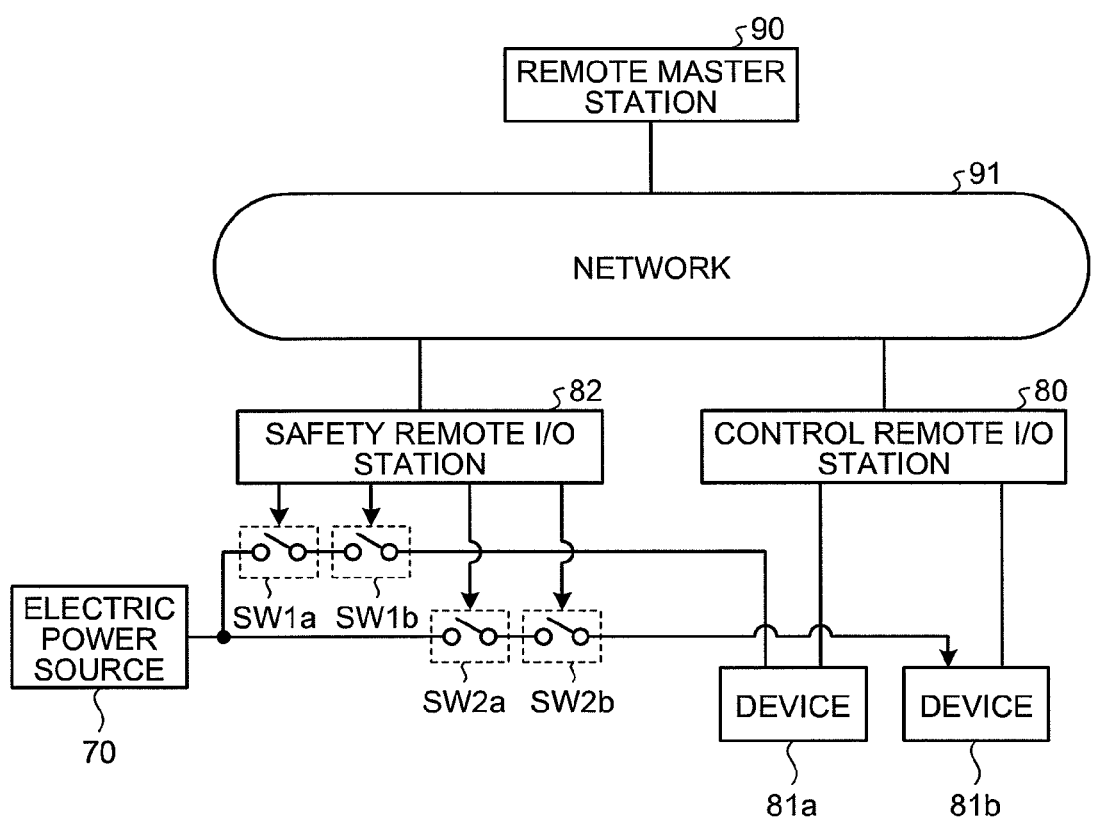
FIG. 1 is a diagram of an example of a network system to which safety control devices according to a first embodiment of the present invention are applied.

A first embodiment of the present invention will be explained, with reference to FIGS. 1 to 7. FIG. 1 is a diagram of an example of a network system to which safety control devices according to the first embodiment of the present invention are applied. In a network system shown in FIG. 1, the following elements are connected to one another via a network 91: a control remote input/output (I/O) station 80 to which devices 81$a$ and 81$b$ (e.g., robots) that are controlling and monitoring targets are connected; a safety remote I/O station 82 controlling switches SW1$a$, SW1$b$, SW2$a$, and SW2$b$ that connect and disconnect the devices 81$a$ and 81$b$ to and from an electric power source 70; and a remote master station 90. The remote master station 90 controls power supplies to the devices 81$a$ and 81$b$ by controlling the switches SW1$a$, SW1$b$, SW2$a$, and SW2$b$ via the safety remote I/O station 82 and connecting/disconnecting the devices 81$a$ and 81$b$ to and from the electric power source 70. The remote master station 90 also controls and monitors the devices 81$a$ and 81$b$ via the control remote I/O station 80.

In FIG. 1, the switches SW1$a$ and SW1$b$ are disposed in series between the electric power source 70 and the device 81$a$. When both of the switches SW1$a$ and SW1$b$ are turned on, the device 81$a$ is connected to the electric power source 70 so that the power is supplied to the device 81$a$. When one of the switches SW1$a$ and SW1$b$ is turned off, the device 81$a$ is disconnected from the electric power source 70 so that the power supply to the device 81$a$ is stopped. In addition, the switches SW2$a$ and SW2$b$ are disposed in series between the electric power source 70 and the device 81$b$. When both of the switches SW2$a$ and SW2$b$ are turned on, the device 81$b$ is connected to the electric power source 70 so that the power is supplied to the device 81$b$. When one of the switches SW2$a$ and SW2$b$ is turned off, the device 81$b$ is disconnected from the electric power source 70 so that the power supply to the device 81$b$ is stopped.

To cause the devices 81$a$ and 81$b$ to operate (i.e., to supply the power to the devices 81$a$ and 81$b$), the remote master station 90 transmits an output command to turn on the switches SW1$a$ and SW2$a$ and to turn on the switches SW1$b$ and SW2$b$, to the safety remote I/O station 82. To cause the devices 81a and 81b to stop operating (i.e., to stop the power supplies to the devices 81a and 81b), the remote master station 90 transmits an output command to turn off the switches SW1a and SW2a and to turn off the switches SW1b and SW2b, to the safety remote I/O station 82.

Based on the output command from the remote master station 90, the safety remote I/O station 82 outputs output signals to turn on/off the switches SW1a, SW1b, SW2a, and SW2b. As explained, the power supplies to the devices 81a and 81b are controlled in a dual manner by using the two switches SW1a and SW2a, and the two switches SW1b and SW2b.

The safety remote I/O station 82 includes a safety control device that controls the switches SW1a and SW1b corresponding to the device 81a and another safety control device that controls the switches SW2a and SW2b corresponding to the device 81b. In the following, the safety control device that controls the switches SW1a and SW1b corresponding to the device 81a will be explained as an example.

Figure 2:
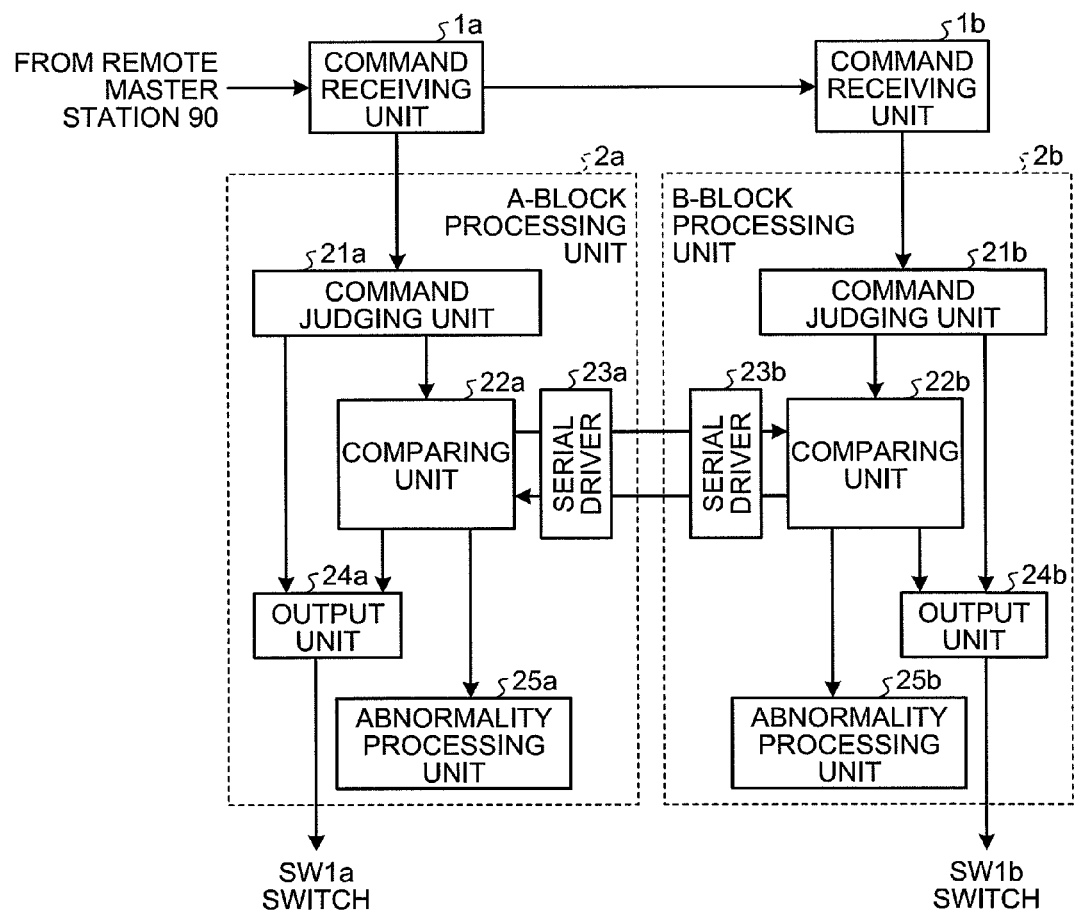
FIG. 2 is a block diagram of a safety control device according to the first embodiment.
Figure 4:
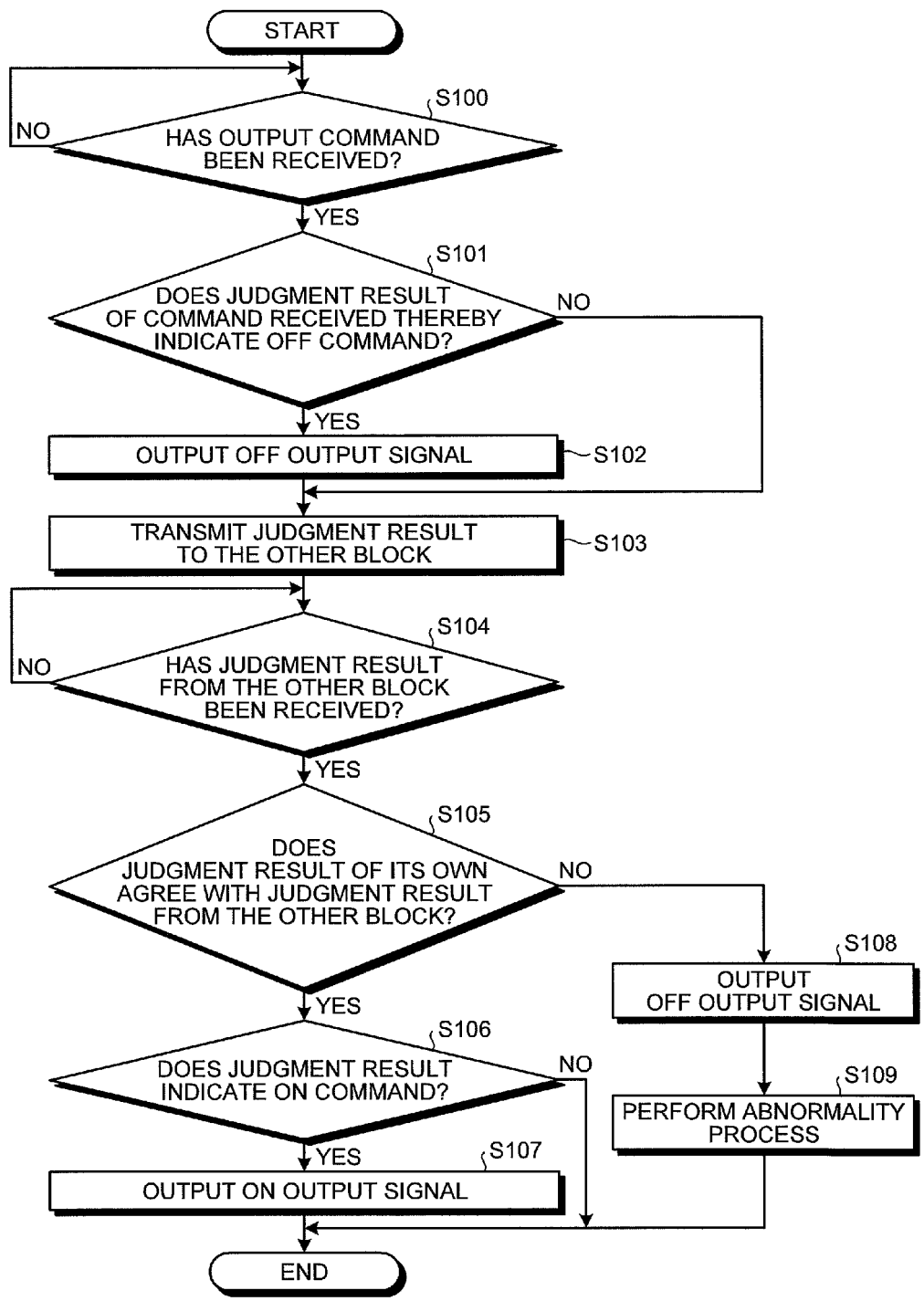
FIG. 4 is a flowchart for explaining an operation performed by an A-block processing unit shown in FIG. 2.

FIG. 2 is a block diagram of a safety control device according to the first embodiment of the present invention. In FIG. 2, the safety control device includes: command receiving units 1a and 1b; an A-block processing unit 2a including a command judging unit 21a, a comparing unit 22a, a serial driver 23a, an output unit 24a, and an abnormality processing unit 25a; and a B-block processing unit 2b including a command judging unit 21b, a comparing unit 22b, a serial driver 23b, an output unit 24b, and an abnormality processing unit 25b.

The command receiving unit 1a has an interface function to receive an output command from the remote master station 90 via the network 91. The command receiving unit 1a outputs the received output command to the command judging unit 21a included in the A-block processing unit 2a and to the command receiving unit 1b. The command receiving unit 1b receives the output command from the command receiving unit 1a and outputs the received output command to the command judging unit 21b included in the B-block processing unit 2b.

The A-block processing unit 2a is a processing unit that controls the switch SW1a, whereas the B-block processing unit 2b is a processing unit that controls the switch SW1b. The A-block processing unit 2a and the B-block processing unit 2b have the same functions. The functions of the A-block processing unit 2a and the B-block processing unit 2b are realized by different hardware or different micro processing units (MPUs).

Each of the command judging units 21a and 21b extracts a command to its own block (i.e., the A block or the B block) from the output commands that are input. Each of the command judging units 21a and 21b then judges whether the extracted command is an ON command or an OFF command. After that, each of the command judging units 21a and 21b outputs a judgment result to the corresponding one of the comparing units 22a and 22b. Further, only if the judgment result indicates that the extracted command is an OFF command, each of the command judging units 21a and 22b notifies the corresponding one of the output units 24a and 24b of an output instruction (i.e., an OFF output instruction) to notify that the output signal should be an OFF output signal.

Each of the serial drivers 23a and 23b has an interface function to perform a serial communication with the other processing unit (i.e., the B-block processing unit 2b for the A-block processing unit 2a; and the A-block processing unit 2a for the B-block processing unit 2b). Each of the comparing units 22a and 22b transmits the judgment result (of its own block) that has been notified by the corresponding one of the command judging units 21a and 21b to the other processing unit, via the corresponding one of the serial drivers 23a and 23b. Also, each of the comparing units 22a and 22b compares the judgment result of its own block with the judgment result from the other processing unit that is received via the corresponding one of the serial drivers 23a and 23b. If the comparison result indicates an agreement (i.e., the two judgment results are the same), each of the comparing units 22a and 22b outputs an output instruction instructing that the judgment result of its own block should be used as an output signal (i.e., the output instruction is an ON output instruction if the judgment result indicates that the command is an ON command and is an OFF output instruction if the judgment result indicates that the command is an OFF command) to the corresponding one of the output units 24a and 24b. In contrast, if the comparison result indicates a disagreement (i.e., the two judgment results are different from each other), each of the comparing units 22a and 22b notifies the corresponding one of the abnormality processing units 25a and 25b of the comparison result.

Based on the output instruction from the corresponding ones of the command judging units 21a and 21b and the comparing units 22a and 22b, each of the output units 24a and 24b outputs an output signal to turn on or off the corresponding one of the switches SW1a and SW1b to the corresponding one of the switches SW1a and SW1b. More specifically, upon receiving an ON output instruction, each of the output units 24a and 24b outputs an ON output signal to turn on the corresponding one of the switches SW1a and SW1b to the corresponding one of the switches SW1a and SW1b. Upon receiving an OFF output instruction, each of the output units 24a and 24b outputs an OFF output signal to turn off the corresponding one of the switches SW1a and SW1b to the corresponding one of the switches SW1a and SW1b.

Upon being notified by the corresponding one of the comparing units 22a and 22b that the comparison result indicates a disagreement, each of the abnormality processing units 25a and 25b performs an abnormality process corresponding to the comparison result indicating a disagreement. The abnormality process corresponding to the comparison result indicating a disagreement is, for example, to notify the remote master station 90 that the comparison result indicates a disagreement or to cause a display means of the safety remote I/O station 82 to display information showing that the judgment results do not agree with each other.

FIG. 3 is a table of relationship between judgment results regarding the commands to the A-block processing unit 2a and the B-block processing unit 2b and the output signals. As shown in FIG. 3, if the judgment result of the command judging unit 21a included in the A-block processing unit 2a is "ON" and the judgment result of the command judging unit 21b included in the B-block processing unit 2b is "ON", both of the output signals that are output by the A-block processing unit 2a and the B-block processing unit 2b are "ON", and both of the switches SW1a and SW1b are turned "ON". As a result, the electric power is supplied to the device 81a and the device 81a operates.

If the judgment result of the command judging unit 21a included in the A-block processing unit 2a is "ON" and the judgment result of the command judging unit 21b included in the B-block processing unit 2b is "OFF", or if the judgment result of the command judging unit 21a included in the A-block processing unit 2a is "OFF" and the judgment result of the command judging unit 21b included in the B-block processing unit 2b is "ON", the judgment results do not agree with each other, both of the output signals that are output by the A-block processing unit 2a and the B-block processing unit 2b are "OFF", and both of the switches SW1a and SW1b are turned "OFF". As a result, the electric power is not supplied to the device 81a, and the device 81a thus stops operating.

If the judgment result of the command judging unit 21a included in the A-block processing unit 2a is "OFF" and the judgment result of the command judging unit 21b included in the B-block processing unit 2b is "OFF", both of the output signals that are output by the A-block processing unit 2a and the B-block processing unit 2b are "OFF", and both of the switches SW1a and SW1b are turned "OFF". As a result, the electric power is not supplied to the device 81a, and the device 81a thus stops operating.

As explained above, the switches SW1a and SW1b controlled by the safety remote I/O station 82 including the safety control devices are disposed in series between the electric power source 70 and the device 81a. To cause the device 81a to operate, the remote master station 90 transmits the output command to turn on the switch SW1a and to turn on the switch SW1b to the safety control device included in the safety remote I/O station 82. To stop the device 81a, the remote master station 90 transmits the output command to turn off the switch SW1a and to turn off the switch SW1b to the safety control device included in the safety remote I/O station 82. Accordingly, the judgment result of the command judging unit 21a in the A-block processing unit 2a agrees with the judgment result of the command judging unit 21b in the B-block processing unit 2b.

There may be situations, however, where the judgment result of the command judging unit 21a in the A-block processing unit 2a does not agree with the judgment result of the command judging unit 21b in the B-block processing unit 2b due to a communication error, a wrong command issued by the remote master station 90, or the like. In those situations, because an abnormality of some sort has occurred, it is dangerous to supply the power to the device 81a to allow the device 81a to operate. Thus, as a process on the safe side, the safety control device outputs the OFF output signal to turn off the switches SW1a and SW1b to stop the power supply to the device 81a so as to stop the device 81a.

Next, an operation performed by the safety control device according to the first embodiment of the present invention will be explained. First, an operation performed by the A-block processing unit 2a will be explained, with reference to the flowchart in FIG. 4. When having received an output command from the remote master station 90 via the network 91, the command receiving unit 1a outputs the received output command to the command judging unit 21a included of the A-block processing unit 2a and to the command receiving unit 1b.

Upon receiving the output command from the command receiving unit 1a (step S100: Yes), the command judging unit 21a extracts a command for its own block (i.e., the A block, that is, the switch SW1a in the present example) from the output command and performs a command judging process to judge whether the extracted command is an ON command or an OFF command (step S101). The command judging unit 21a then outputs the judgment result obtained by performing the command judging process to the comparing unit 22a.

If the judgment result indicates that the extracted command is an OFF command (step S101: Yes), the command judging unit 21a notifies the output unit 24a of an OFF output instruction. The output unit 24a then outputs an OFF output signal to the switch SW1a (step S102).

Upon receiving the judgment result from the command judging unit 21a, the comparing unit 22a transmits the judgment result to the other block, which is the B-block processing unit 2b, via the serial driver 23a (step S103). After that, the comparing unit 22a waits until a judgment result from the B-block processing unit 2b is received.

Upon receiving the judgment result from the B-block processing unit 2b via the serial driver 23a (step S104: Yes), the comparing unit 22a performs a comparing process to judge whether the judgment result that has been notified by the command judging unit 21a agrees with the judgment result that has been received from the B-block processing unit 2b (step S105).

As a result of the comparing process, if the comparing unit 22a obtains a comparison result indicating that the judgment result notified by the command judging unit 21a agrees with the judgment result received from the B-block processing unit 2b (step S105: Yes), the comparing unit 22a judges whether the judgment result notified by the command judging unit 21a indicates that the command is an ON command (step S106).

If the comparing unit 22a has judged that the judgment result notified by the command judging unit 21a indicates that the command is an ON command (step S106: Yes), the comparing unit 22a notifies the output unit 24a of an ON output instruction. The output unit 24a then outputs an ON output signal to the switch SW1a and ends the process (step S107). If the comparing unit 22a has judged that the judgment result notified by the command judging unit 21a indicates that the command is an OFF command (step S106: No), the comparing unit 22a ends the process without notifying the output unit 24a.

As a result of the comparing process, if the comparing unit 22a obtains a comparison result indicating that the judgment result notified by the command judging unit 21a does not agree with the judgment result received from the B-block processing unit 2b (step S105: No), the comparing unit 22a notifies the output unit 24a of an OFF output instruction. The output unit 24a then outputs an OFF output signal to the switch SW1a (step S108). The comparing unit 22a outputs information showing that the comparison result indicates a disagreement to the abnormality processing unit 25a. The abnormality processing unit 25a performs a predetermined abnormality process and ends the process (step S109).

The operation performed by the B-block processing unit 2b is substantially the same as the operation performed by the A-block processing unit 2a. The differences are that the processing unit is the B-block processing unit 2b, that the other processing unit is the A-block processing unit 2a, and that the switch being the controlling target is the switch SW1b. Thus, the explanation will be omitted.

Figure 5:
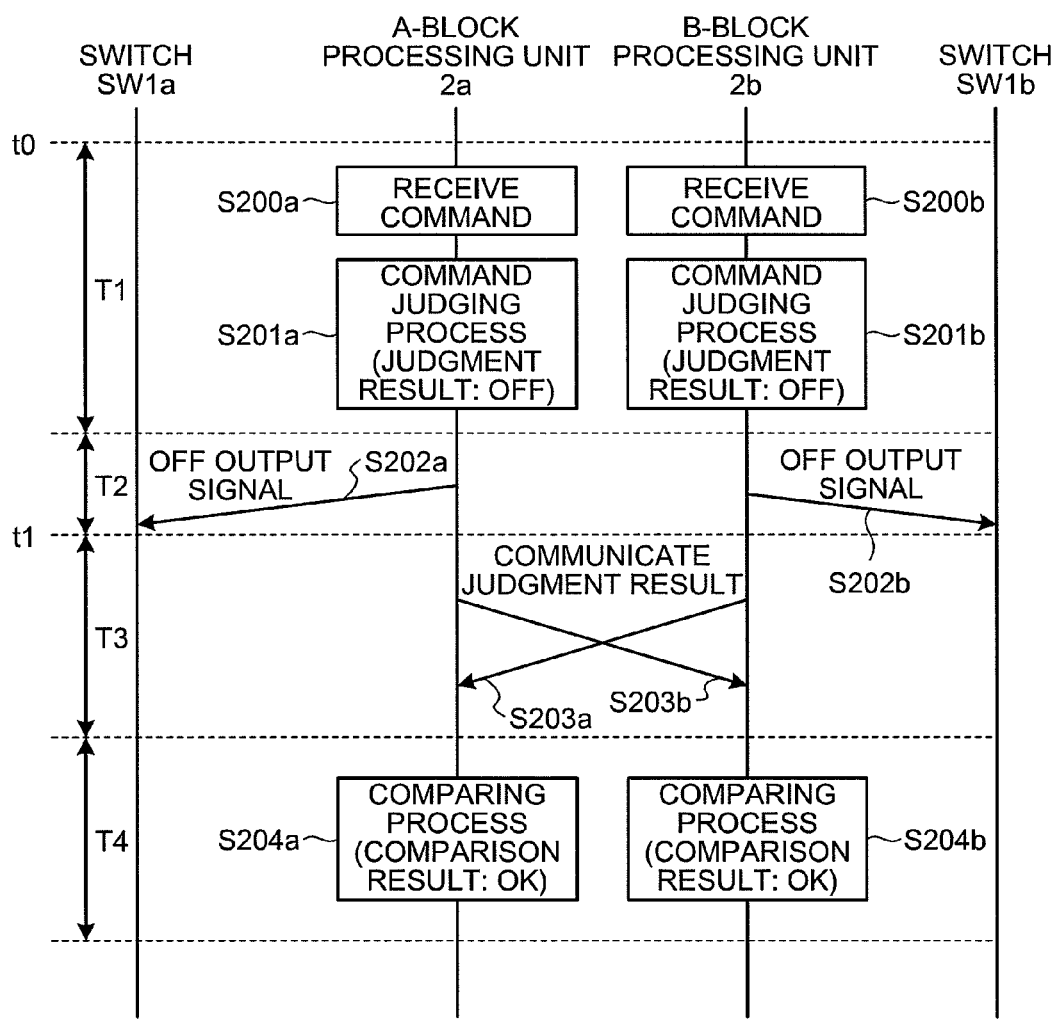
FIG. 5 is a sequence diagram for explaining an operation performed by the safety control device according to the first embodiment.

Next, an operation performed by the safety control device when the judgment results of the command judging unit 21a of the A-block processing unit 2a and the command judging unit 21b of in the B-block processing unit 2b both each indicate that the command is an OFF command will be explained, with reference to the sequence diagram in FIG. 5. Upon receiving an output command from the remote master station 90 via the network 91, the command receiving unit 1a outputs the received output command to the command judging unit 21a of the A-block processing unit 2a and to the command receiving unit 1b. The command receiving unit 1b outputs the output command received from the command receiving unit 1a to the command judging unit 21b of the B-block processing unit 2b.

Upon receiving the output command from the corresponding one of the command receiving units 1a and 1b (steps S200a and S200b), each of the command judging units 21a and 21b performs the command judging process at step S101 that has been explained above with reference to the flowchart in FIG. 4 (steps S201a and S201b).

It is assumed now that the judgment results of the command judging units 21a and 21b both indicate that the command is an OFF command. Each of the command judging units 21a and 21b notifies the corresponding one of the output units 24a and 24b of an OFF output instruction so that each of the outputs units 24a and 24b outputs an OFF output signal to the corresponding one of the switches SW1a and SW1b (steps S202a and S202b). As a result, the switches SW1a and SW1b are turned off, so that the power supply to the device 81a is stopped, and the device 81a thus stops operating.

Each of the command judging units 21a and 21b notifies the corresponding one of the comparing units 22a and 22b that the judgment result indicates that the command is an OFF command. Each of the comparing units 22a and 22b transmits information showing that the judgment result indicates that the command is an OFF command to the comparing unit in the other block (i.e., the comparing unit 22b or the comparing unit 22a), and also, receives information showing that the judgment result from the other block indicates that the command is an OFF command (steps S203a and S203b).

Each of the comparing units 22a and 22b performs the comparing process at step S105 that has been explained above with reference to the flowchart in FIG. 4 (steps S204a and S204b). In the present example, each of the comparing units 22a and 22b learns that the judgment result of its own block indicates that the command is an OFF command and that the judgment result received from the other block also indicates that the command is an OFF command. As a result, because the comparison result indicates an agreement ("OK"), the process is ended.

As explained, if the judgment results of the A-block processing unit 2a and the B-block processing unit 2b both indicate that the command is an OFF command, the time period between a time t0 when reception of the command starts and a time t1 when the switches SW1a and SW1b are turned off is equal to the sum of a time period T1 required to receive the command and perform the command judging process of making a judgment on the received command and a time period T2 required to output the "OFF" output signal, regardless of a time period T3 required to transmit and receive the judgment results and a time period T4 required to perform the comparing process.

Figure 6:
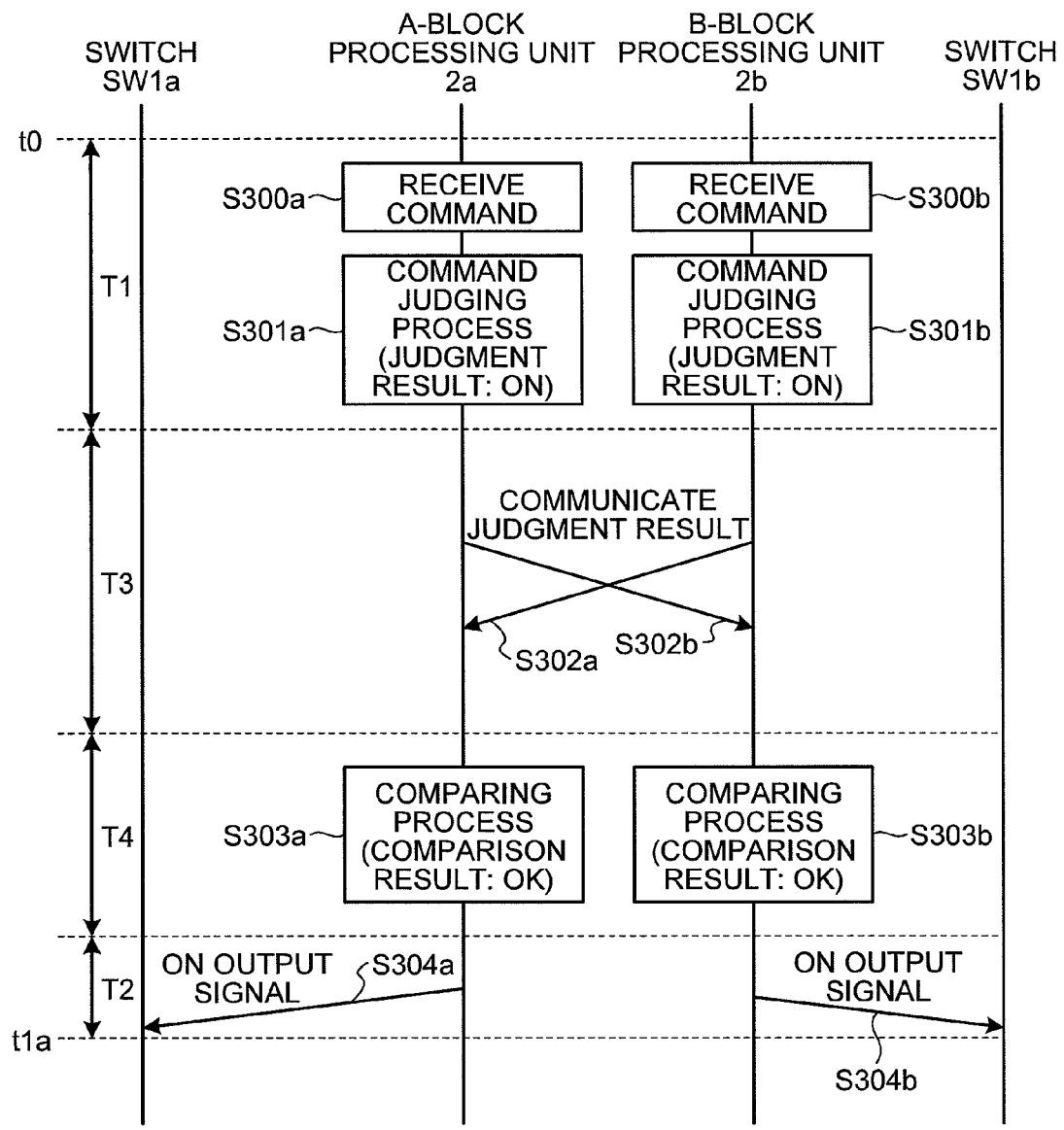
FIG. 6 is a sequence diagram for explaining another operation performed by the safety control device according to the first embodiment.

Next, an operation performed by the safety control device when the judgment result of the command judging unit 21a included in the A-block processing unit 2a and the judgment result of the command judging unit 21b included in the B-block processing unit 2b both indicate that the command is an ON command will be explained, with reference to the sequence diagram in FIG. 6. Upon receiving an output command from the remote master station 90 via the network 91, the command receiving unit 1a outputs the received output command to the command judging unit 21a and to the command receiving unit 1b. The command receiving unit 1b outputs the output command received from the command receiving unit 1a to the command judging unit 21b.

Upon receiving the output command from the corresponding one of the command receiving units 1a and 1b (steps S300a and S300b), each of the command judging units 21a and 21b performs the command judging process at step S101 that has been explained above with reference to the flowchart in FIG. 4 (steps S301a and S301b).

In this situation, let us assume that the judgment result of the command judging unit 21a of the A-block processing unit 2a and the judgment result of the command judging unit 21b of the B-block processing unit 2b both indicate that the command is an ON command. Each of the command judging units 21a and 21b notifies the corresponding one of the comparing units 22a and 22b that the judgment result indicates that the command is an ON command. Each of the comparing units 22a and 22b transmits information showing that the judgment result indicates that the command is an ON command to the comparing unit in the other block (i.e., the comparing unit 22b or the comparing unit 22a), and also, receives information showing that the judgment result from the other block indicates that the command is an ON command (steps S302a and S302b).

Each of the comparing units 22a and 22b performs the comparing process at step S105 that has been explained above with reference to the flowchart in FIG. 4 (steps S303a and S303b). In the present example, each of the comparing units 22a and 22b learns that the judgment result of its own block indicates that the command is an ON command and that the judgment result received from the other block also indicates that the command is an ON command. As a result, the comparison result indicates an agreement ("OK"). Because the judgment result of its own block indicates that the command is an ON command, each of the comparing units 22a and 22b notifies the corresponding one of the output units 24a and 24b of an ON output instruction, so that each of the output units 24a and 24b outputs an ON output signal to the corresponding one of the switches SW1a and SW1b (steps S304a and S304b). As a result, the switches SW1a and SW1b are turned on, so that the power is supplied to the device 81a, and the device 81a thus starts operating.

As explained, if the judgment results of the A-block processing unit 2a and the B-block processing unit 2b both indicate that the command is an ON command, the time period between the time t0 when reception of the command starts and a time t1a when the switches SW1a and SW1b are turned on is equal to the sum of a time period T1 required to receive the command and perform the command judging process of making a judgment on the received command, the time period T3 required to transmit and receive the judgment results, the time period T4 required to perform the comparing process, and the time period T2 required to output the "ON" output signal.

Figure 7:
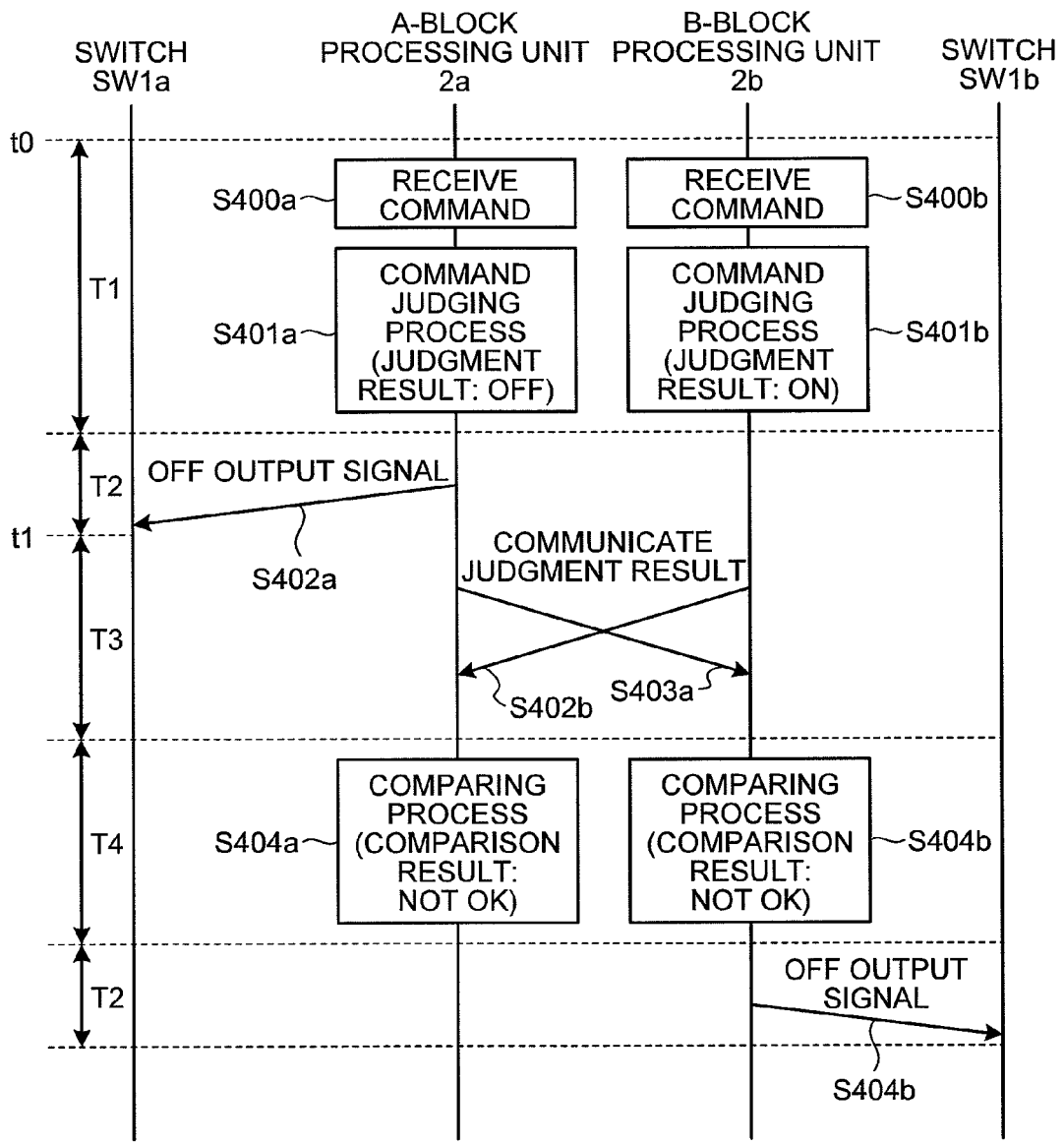
FIG. 7 is a sequence diagram for explaining yet another operation performed by the safety control device according to the first embodiment.

Next, an operation performed by the safety control device when the judgment result of the command judging unit 21a included in the A-block processing unit 2a is different from the judgment result of the command judging unit 21b included in the B-block processing unit 2b will be explained, with reference to the sequence diagram in FIG. 7, with an example in which the judgment result of the command judging unit 21a of the A-block processing unit 2a indicates "OFF" and the judgment result of the command judging unit 21b of the B-block processing unit 2b indicates "ON".

Upon receiving an output command from the remote master station 90 via the network 91, the command receiving unit 1a outputs the received output command to the command judging unit 21a of the A-block processing unit 2a and to the command receiving unit 1b. The command receiving unit 1b outputs the output command received from the command receiving unit 1a to the command judging unit 21b of the B-block processing unit 2b.

When having received the output command from the corresponding one of the command receiving units 1a and 1b (steps S400a and S400b), each of the command judging units 21a and 21b performs the command judging process at step S101 that has been explained above with reference to the flowchart in FIG. 4 (steps S401a and S401b).

It is assumed here that the judgment result of the command judging unit 21a indicates that the command is an OFF command and the judgment result of the command judging unit 21b indicates that the command is an ON command. The command judging unit 21a notifies the output unit 24a of an OFF output instruction, so that the output unit 24a outputs an OFF output signal to the switch SW1a (step S402a). In addition, the command judging unit 21a notifies the comparing unit 22a that the judgment result indicates that the command is an OFF command. The comparing unit 22a transmits information showing that the judgment result indicates that the command is an OFF command to the comparing unit in the other block (i.e., the comparing unit 22a) (step S403a).

Because the judgment result indicates that the command is an ON command, the command judging unit 21b notifies the comparing unit 22b that the judgment result indicates that the command is an ON command, without notifying the output unit 24b of any output instruction. The comparing unit 22b transmits information showing that the judgment result indicates that the command is an ON command to the comparing unit 22a (step S402b).

Each of the comparing units 22a and 22b receives the judgment result from the other block and performs the comparing process at step S105 that has been explained above with reference to the flowchart in FIG. 4 (steps S404a and S403b). In the present example, the judgment result of the A-block processing unit 2a indicates that the command is an OFF command and the judgment result of the B-block processing unit 2b indicates that the command is an ON command. As a result, the comparison result indicates a disagreement ("NOT OK"). Because the judgment result of its own block indicates that the command is an OFF command, the comparing unit 22a notifies the abnormality processing unit 25a that the comparison result indicates a disagreement, without notifying the output unit 24a of any output instruction. The abnormality processing unit 25a then performs the abnormality process corresponding to the comparison result indicating a disagreement.

Because the comparison result indicates a disagreement, and also, the judgment result of its own block indicates that the command is an ON command, the comparing unit 22b notifies the output unit 24b of an OFF output instruction, so that the output unit 24b outputs an OFF output signal to the switch SW1b (step S404b). Also, the comparing unit 22b notifies the abnormality processing unit 25b that the comparison result indicates a disagreement, so that the abnormality processing unit 25b performs the abnormality process corresponding to the comparison result indicating a disagreement.

As explained, if the comparison result indicates a disagreement, the block in which the judgment result of its own block indicates that the command is an ON command (i.e., the B-block processing unit 2b in the present example) outputs the OFF output signal so as to turn off the switch SW1b, after the comparing process has been performed. However, the block in which the judgment result of its own block indicates that the command is an OFF command (i.e., the A-block processing unit 2a in the present example) outputs the OFF output signal so as to turn off the switch SW1a, without performing the comparing process. Because the switches SW1a and SW1b are disposed in series between the electric power source 70 and the device 81a, the power supply to the device 81a is stopped at the point in time when the switch SW1a is turned off, and the device 81a thus stops operating. Accordingly, if the comparison result indicates a disagreement, the time period between the time t0 when reception of the command starts and the time t1 when the switch SW1a is turned off is equal to the sum of the time period T1 required to receive the command and perform the command judging process of making a judgment on the received command and the time period T2 required to output the "OFF" output signal, regardless of the time period T3 required to transmit and receive the judgment results and the time period T4 required to perform the comparing process.

As explained above, according to the first embodiment, attention has been paid to the fact that each of the command judging units 21a and 21b judges whether the output command that has been input from the outside is an operation permission command (i.e., an ON command) or a safety operation command (i.e., an OFF command), and if it has been judged that one of the judgment results indicates that the command is an OFF command, even if the other judgment result indicates that the command is an ON command, the judgment results do not agree with each other, and the OFF output signal to cause the device 81a to perform the safety operation (i.e., to stop operating) is output. Accordingly, if the judgment result indicates that the command is an OFF command, the OFF output signal to stop the device 81a is output, without comparing the judgment result with the judgment result of the other command judging unit (i.e., the command judging unit 21a or the command judging unit 21b). As a result, it is possible to shorten the response time, without having to use CPUs that have a higher level of performance for the purpose of increasing the speeds of communicating the judgment results and the comparing processes.

Second Embodiment

Next, a safety control device according to a second embodiment of the present invention will be explained, with reference to FIGS. 8 to 10.

Generally, each safety control device is required to output, without fail, a safety operation command to the target device, when both of the blocks have received an output command instructing a safety operation or when an output command for which the two blocks do not agree with each other has been received due to some abnormality. Thus, each safety control device performs a dark test at a predetermined time to diagnose whether it is possible to output a signal to trigger the safety operation without fail.

Further, there are network systems in which the time intervals at which communication is performed between a remote master station and a safety remote I/O station are regular. The safety control device according to the second embodiment that is explained in the following sections is applied to such a network system in which output commands are received from a remote master station at regular time intervals. By properly setting the time intervals at which the output commands are received and the time intervals at which the dark tests are performed, it is possible to make the timing to output the output signal to stop the target device even more early than in the example according to the first embodiment.

More specifically, based on the time period that has elapsed since an output command is received, the safety control device according to the second embodiment performs a process to output an OFF output signal a little before the next output command is received. After that, when the processing units in both of the blocks each receive an ON command, the safety control device performs a process to output an ON output signal based on the ON command. The safety control device according to the second embodiment monitors OFF output signals/ON output signals that are output based on the series of processes and uses this process as a dark test to diagnose whether the safety control device is able to output the ON output signals/OFF output signals without fail.

If the safety control device according to the second embodiment has received an output command for which the judgment results of the processing units in the two blocks do not agree with each other, the safety control device had already performed the process to output the OFF output signal at the point in time when the safety control device has received the output command. Thus, each of the switches SW1a and SW1b receives the OFF output signal that is output as a result of this process, before receiving the OFF output signal that is secondly output based on the disagreed output command that has been received. In other words, as a result, the safety control device according to the second embodiment is able to cause the target device to perform the safety operation earlier than in the first embodiment, by using the OFF output signal that is output as a test signal for the dark test before the output command is received.

Figure 8:
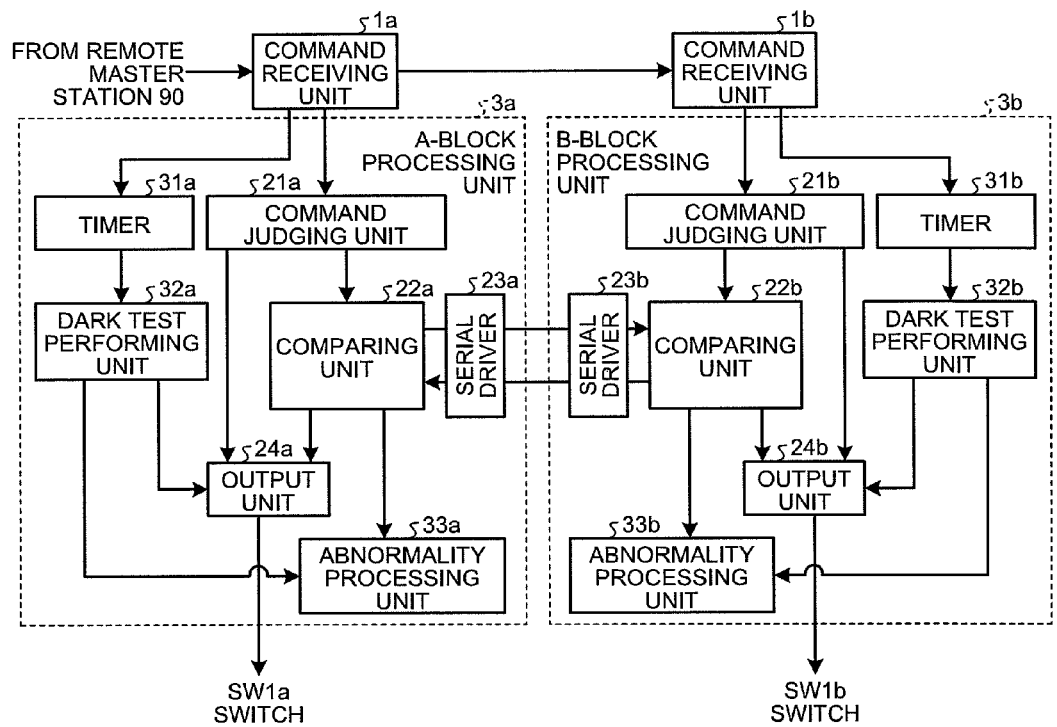
FIG. 8 is a block diagram of a safety control device according to a second embodiment of the present invention.
Figure 9:
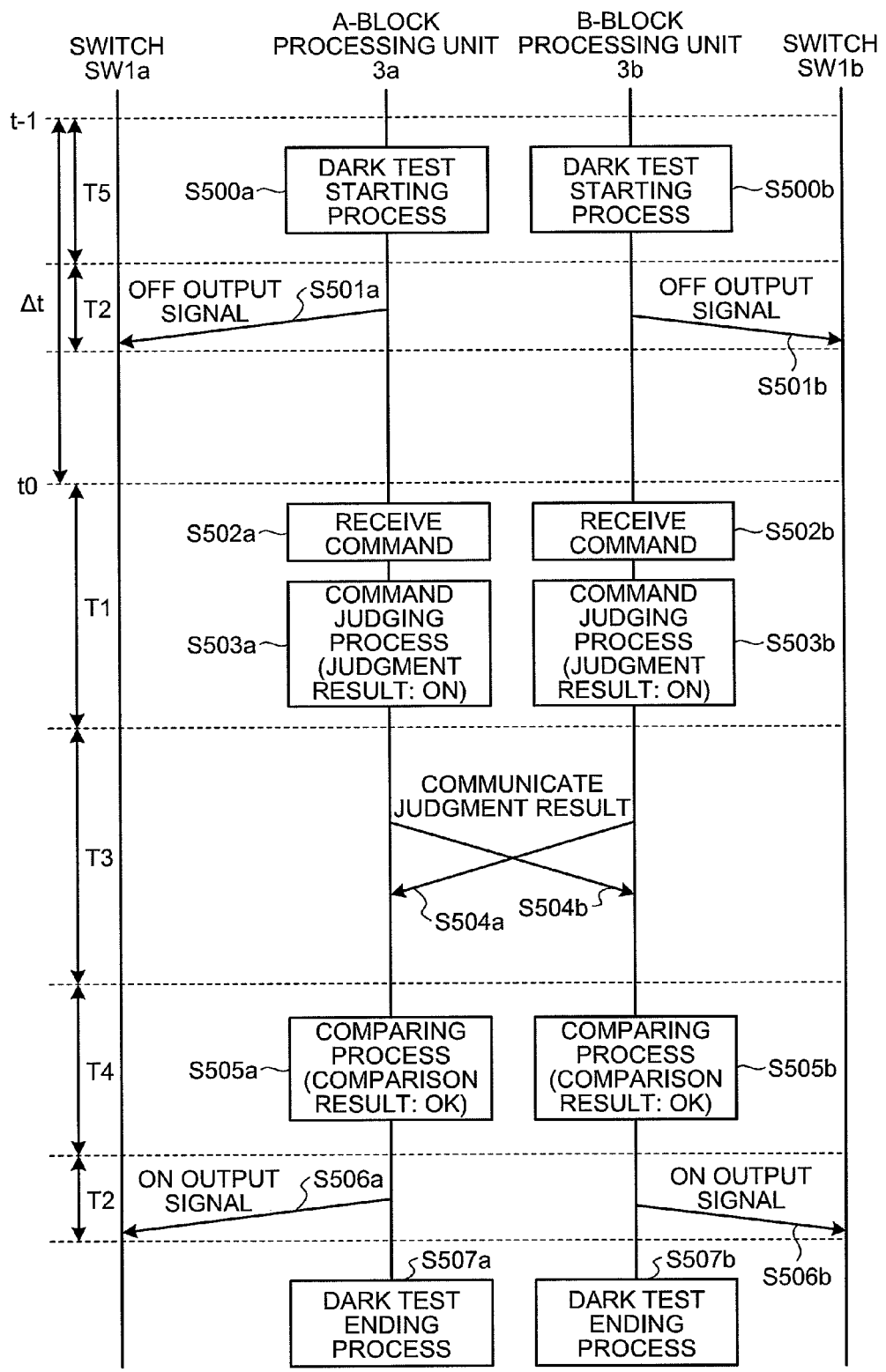
FIG. 9 is a sequence diagram for explaining an operation performed by the safety control device according to the second embodiment.

FIG. 8 is a block diagram of the safety control device according to the second embodiment. Some of the elements that have the same functions as those in the first embodiment will be referred to by using the same reference characters as those in the first embodiment, and the detailed explanation thereof will be omitted.

As shown in FIG. 8, the safety control device according to the second embodiment includes: the command receiving units 1a and 1b; an A-block processing unit 3a including the command judging unit 21a, the comparing unit 22a, the serial driver 23a, the output unit 24a, a timer 31a, a dark test performing unit 32a, and an abnormality processing unit 33a; and a B-block processing unit 3b including the command judging unit 21b, the comparing unit 22b, the serial driver 23b, the output unit 24b, a timer 31b, a dark test performing unit 32b, and an abnormality processing unit 33b.

When a predetermined time period has elapsed since a point in time at which the corresponding one of the processing units (i.e., the A-block processing unit 3a and the B-block processing unit 3b) receives an output command, each of the timers 31a and 31b notifies the corresponding one of the dark test performing units 32a and 32b of a dark test performing command instructing that a dark test should be performed. The predetermined time period is set to a time period that is slightly shorter than each of the time intervals at which the output commands are received. As a result, each of the timers 31a and 31b notifies the corresponding one of the dark test performing units 32a and 32b of the dark test performing command before an output command is received.

When having been notified of the dark test performing command by the corresponding one of the timers 31a and 31b, each of the dark test performing units 32a and 32b notifies the corresponding one of the output units 24a and 24b of an OFF output command. Also, each of the dark test performing units 32a and 32b monitors the corresponding one of the output units 24a and 24b, and if an OFF output signal is not issued even though the dark test performing unit 32a (or the dark test performing unit 32b) has output an OFF output instruction or if an ON output signal is not issued even though the comparing unit 22a (or the comparing unit 22b) has notified the corresponding one of the output units 24a and 24b of an ON output instruction, the dark test performing unit 32a (or the dark test performing unit 32b) notifies the corresponding one of the abnormality processing units 33a and 33b of the situation where the OFF output signal or the ON output signal is not properly issued.

When having been notified by the corresponding one of the dark test performing units 32a and 32b of the situation where the OFF output signal or the ON output signal is not properly issued, each of the abnormality processing units 33a and 33b performs an abnormality process corresponding to the notification. For example, like the abnormality process corresponding to the comparison result indicating a disagreement, each of the abnormality processing units 33a and 33b notifies the remote master station 90 of the situation where the OFF output signal or the ON output signal is not properly issued or causes a display means of the safety remote I/O station 82 to display information describing the situation.

Next, an operation performed by the safety control device according to the second embodiment of the present invention will be explained. An operation performed by the safety control device when the judgment result of the command judging unit 21a in the A-block processing unit 3a and the judgment result of the command judging unit 21b in the B-block processing unit 2b both indicate that the command is an ON command will be explained, with reference to the sequence diagram in FIG. 9. If the time intervals at which the output commands are received is $\Delta T$, and a time period that is sufficiently shorter than $\Delta T$ is $\Delta t$, explanation will be given assuming that each of the timers 31a and 31b notifies the corresponding one of the dark test performing units 32a and 32b of a dark test performing command when a time period "$\Delta T-\Delta t$" has elapsed since the immediately preceding output command was received.

First, each of the timers 31a and 31b starts counting when the corresponding one of the processing units (i.e., the A-block processing unit 3a and the B-block processing unit 3b) receives the immediately preceding output command. When the time period "$\Delta T-\Delta t$" has elapsed since the point in time at which the counting process was started, each of the processing units (i.e., the A-block processing unit 3a and the B-block processing unit 3b) performs a dark test starting process (steps S500a and S500b). More specifically, each of the timers 31a and 31b notifies the corresponding one of the dark test performing units 32a and 32b of a dark test performing command. Upon being notified of the dark test performing command, each of the dark test performing units 32a and 32b starts monitoring the corresponding one of the output units 24a and 24b and notifies the corresponding one of the output units 24a and 24b of an OFF output instruction. The point in time when the time period "$\Delta T-\Delta t$" has elapsed since the time at which the immediately preceding output command was received will be denoted as "t−1".

Subsequently, each of the output units 24a and 24b outputs an OFF output signal to the corresponding one of the switches SW1a and SW1b (steps S501a and S501b). Each of the dark test performing units 32a and 32b judges whether the OFF output signal has been properly output from the corresponding one of the output units 24a and 24b. If the dark test performing unit 32a (or the dark test performing unit 32b) judges that the OFF output signal has not been properly output, the dark test performing unit 32a (or the dark test performing unit 32b) notifies the corresponding one of the abnormality processing units 33a and 33b, so that the abnormality process is performed.

When the time period $\Delta T$ has elapsed since the immediately preceding output command was received (i.e., when the time period $\Delta t$ has elapsed since the time "t−1"), each of the command judging units 21a and 21b receives an output command from the corresponding one of the command receiving units 1a and 1b (steps S502a and S502b). After that, the same operations as steps S301a through S303a and steps S301b through S303b according to the first embodiment are performed as steps S503a through S505a and steps S503b through S505b, respectively.

Subsequently, each of the comparing units 22a and 22b notifies the corresponding one of the output units 24a and 24b of an ON output instruction, so that each of the output units 24a and 24b outputs an ON output signal to the corresponding one of the switches SW1a and SW1b (steps S506a and S506b). Each of the dark test performing units 32a and 32b judges whether the ON output signal has been properly output. If the dark test performing unit 32a (or the dark test performing unit 32b) has judged that the ON output signal has not been properly output, the dark test performing unit 32a (or the dark test performing unit 32b) notifies the corresponding one of the abnormality processing units 33a and 33b, so that the abnormality process is performed. If the ON output signal has been properly output, each of the dark test performing units 32a and 32b performs a dark test ending process to end the process of monitoring the corresponding one of the output units 24a and 24b (steps S507a and S507b).

As explained, by outputting the OFF output signal before the A-block processing unit 3a and the B-block processing unit 3b each receive the output command, the safety control device turns off the switches SW1a and SW1b at the time that is earlier than the time t0 when the output command is received, by a time period obtained by subtracting a time period T5 required to perform the dark test starting process and the time period T2 required to output the OFF output signal from the time period Δt. Further, after receiving the output command, the safety control device outputs the ON output signal with the same timing as in the first embodiment, so as to turn on the switches SW1a and SW1b. Furthermore, the safety control device uses the OFF output signal and the ON output signal as the test signals for the dark test, so that the abnormality process can be performed when one of the test signals has not been properly output.

Next, an operation performed by the safety control device if the judgment result of the command judging unit 21a in the A-block processing unit 3a is different from the judgment result of the command judging unit 21b in the B-block processing unit 3b will be explained. FIG. 10 is a sequence diagram for explaining an operation performed by the safety control device if the judgment result of the command judging unit 21a in the A-block processing unit 3a is "OFF" and the judgment result of the command judging unit 21b included in the B-block processing unit 3b is "ON".

Figure 10:
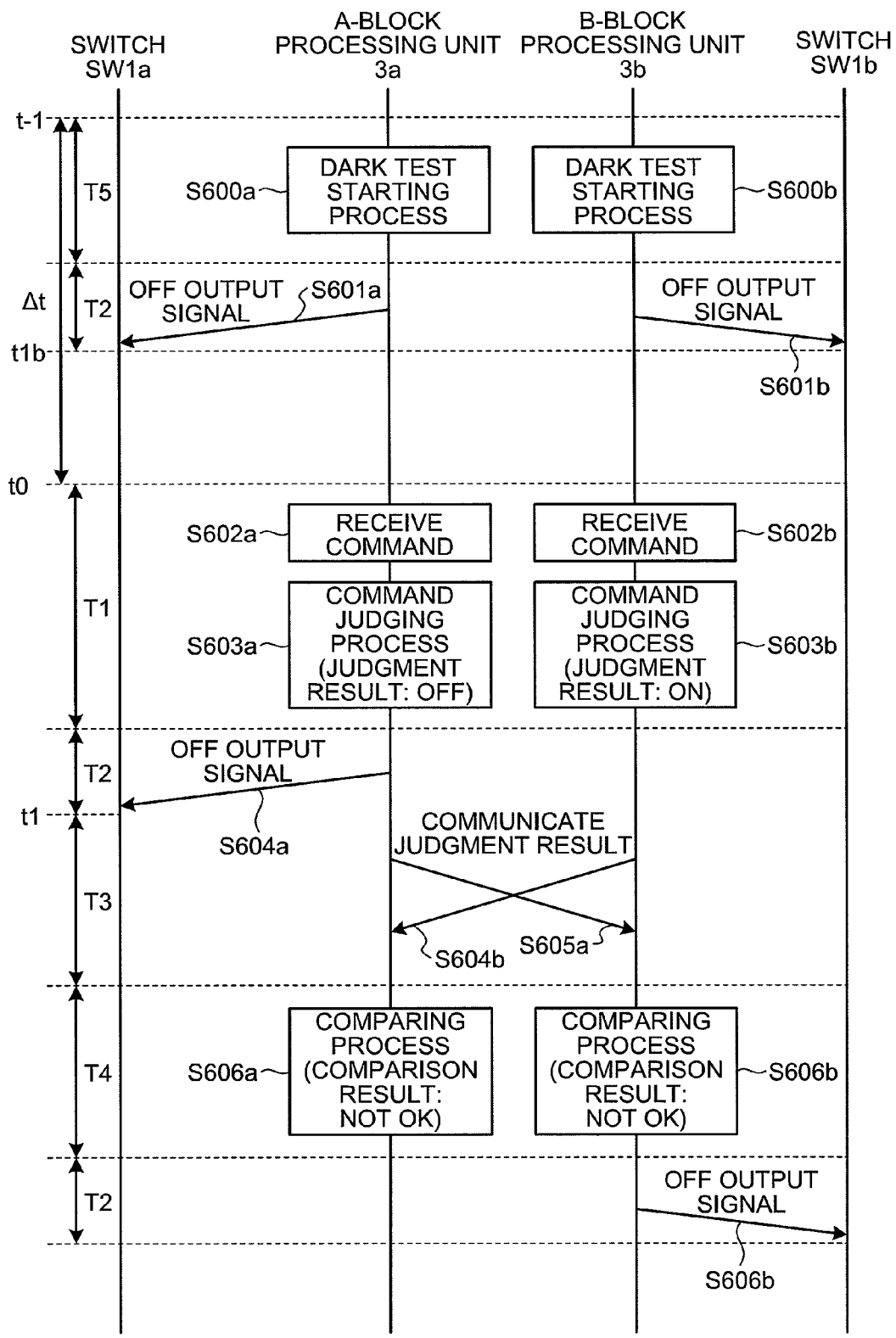
FIG. 10 is a sequence diagram for explaining another operation performed by the safety control device according to the second embodiment.

In FIG. 10, first, each of the timers 31a and 31b starts counting when the corresponding one of the processing units (i.e., the A-block processing unit 3a and the B-block processing unit 3b) has received the immediately preceding output command. When the time period "ΔT-Δt" has elapsed since the point in time at which the counting process was started, each of the processing units (i.e., the A-block processing unit 3a and the B-block processing unit 3b) performs the dark test starting process (steps S600a and S600b).

After that, each of the output units 24a and 24b outputs an OFF output signal to the corresponding one of the switches SW1a and SW1b (steps S601a and S601b). Each of the dark test performing units 32a and 32b judges whether the OFF output signal has been properly output from the corresponding one of the output units 24a and 24b. If the dark test performing unit 32a (or the dark test performing unit 32b) has judged that the OFF output signal has not been properly output, the dark test performing unit 32a (or the dark test performing unit 32b) notifies the corresponding one of the abnormality processing units 33a and 33b, so that the abnormality process is performed.

When the time period ΔT has elapsed since the immediately preceding output command was received, each of the command judging units 21a and 21b receives an output command from the corresponding one of the command receiving units 1a and 1b (steps S602a and S602b). After that, the same operations as steps S401a through S404a and steps S401b through S404b according to the first embodiment are performed as steps S603a through S606a and steps S603b through S606b, respectively.

When attention is paid to the output of the OFF output signal, each of the processing units (i.e., the A-block processing unit 3a and the B-block processing unit 3b) outputs the OFF output signal as a test signal for the dark test at the corresponding one of steps S601a and S601b. After that, at step S604a, the A-block processing unit 3a outputs the OFF output signal to the switch SW1a, based on the judgment result of the command judging unit 21a having judged that the command is an OFF command. After that, at step S606b, the B-block processing unit 3b outputs the OFF output signal to the switch SW1b.

In other words, if the safety control device has received an output command for which the judgment results of the two blocks do not agree with each other, the safety control device outputs no ON output signal after outputting the OFF output signals at steps S601a and S601b. Consequently, the safety control device has exercised safety control with the use of the OFF output signals, by using the test signals for the dark test that are output before receiving the output command for which the judgment results of the two blocks do not agree with each other. In other words, a time "t1b" at which the electric power supply to the device 81a or the device 81b is cut off is earlier than the time t1 explained in the first embodiment, by the time period obtained by subtracting the time period T5 required to perform the dark test starting process from the sum of the time period Δt and the time period T1 required to receive the command and perform the command judging process of making a judgment on the received command.

Next, an operation performed by the safety control device when the judgment results of the command judging unit 21a in the A-block processing unit 3a and the command judging unit 21b in the B-block processing unit 3b both indicate that the command is an OFF command will be explained. In this situation also, the safety control device first outputs an OFF output signal as a test signal for the dark test that is performed immediately before an output command is received. After that, based on the judgment results regarding the received output signal, the safety control device outputs an OFF output signal. In other words, in the same manner as in the situation explained above where an output command for which the judgment results of the two blocks do not agree with each other has been received, the safety control device exercises safety control at the time that is earlier than the time according to the first embodiment by the time period obtained by subtracting the time period T5 required to perform the dark test starting process from the sum of the time period Δt and the time period T1 required to receive the command and perform the command judging process of making a judgment on the received command.

As explained above, according to the second embodiment, the present invention is applied to a safety control device to which an output command is input from the outside thereof at regular time intervals, so that the output signal to stop the power supply to the device 81a or the device 81b is output before the output command is input, based on the time period measured by the corresponding one of the timers 31a and 31b and the time intervals at which the output commands are input. With these arrangements, the safety control device is able to perform the outputting process to cause the target device to perform the safety operation even earlier than in the first embodiment. Further, the safety control device is configured so as to perform the dark test by using, as the test signals, the output signal to stop the power supply to the device 81a or the device 81b that is output before the output command is input, as well as the ON output signal that is output after the output command has been input if both of the judgment results regarding the output command that has been input indicate that the command is an ON command. Thus, it is possible to eliminate the trouble of performing a dark test separately.

Third Embodiment

Next, a safety control device according to a third embodiment of the present invention will be explained, with reference to FIGS. 11 to 14.

For example, in a situation where the quality of communication between the safety remote I/O station and the remote master station is not sufficiently high, and an attempt to communicate the output command is repeatedly made, the time intervals at which the output commands are received by the safety remote I/O station are not regular. If the time intervals at which the output commands are received are not regular like this, it is not possible to start a dark test, like in the second embodiment, by outputting an OFF output signal before the output command is received, based on the time period that has elapsed since the output command is received. Accordingly, a safety control device according to the third embodiment starts a dark test by outputting an OFF output signal immediately after having completed the process of receiving an output command.

Figure 11:
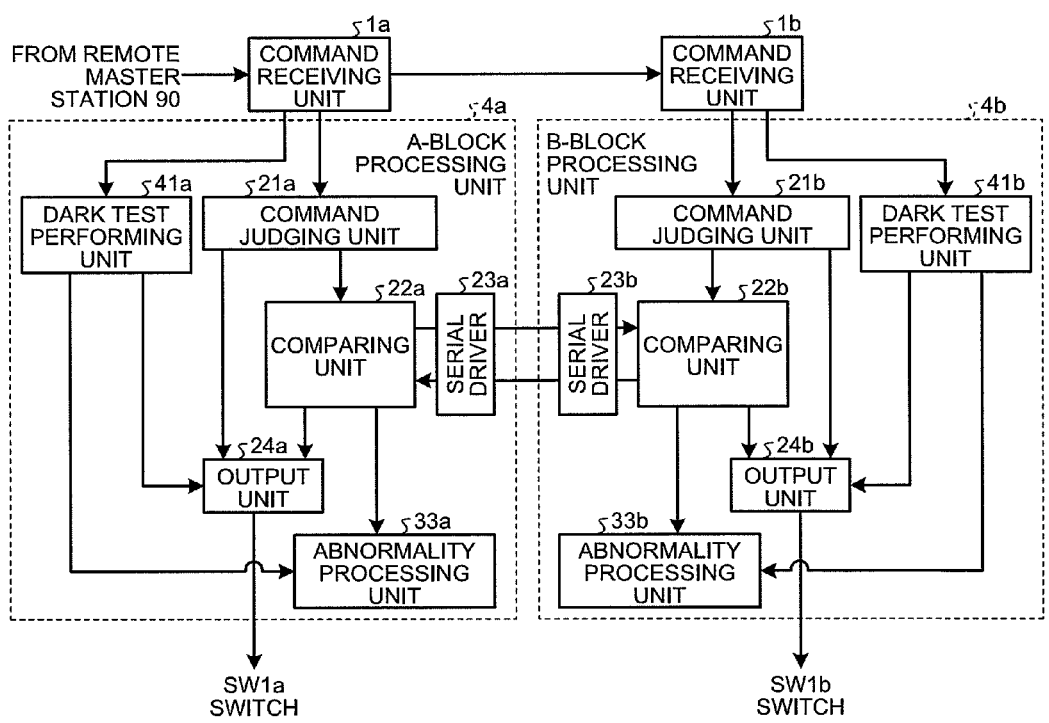
FIG. 11 is a block diagram of a safety control device according to a third embodiment of the present invention.

FIG. 11 is a block diagram of a safety control device according to the third embodiment of the present invention. Some of the constituent elements that have the same functions as those in the second embodiment will be referred to by using the same reference characters as those in the second embodiment, and the detailed explanation thereof will be omitted.

As shown in FIG. 11, the safety control device according to the third embodiment includes: the command receiving units 1a and 1b; an A-block processing unit 4a including the command judging unit 21a, the comparing unit 22a, the serial driver 23a, the output unit 24a, a dark test performing unit 41a, and the abnormality processing unit 33a; and a B-block processing unit 4b including the command judging unit 21b, the comparing unit 22b, the serial driver 23b, the output unit 24b, a dark test performing unit 41b, and the abnormality processing unit 33b.

Each of the dark test performing units 41a and 41b monitors the corresponding one of the command receiving units 1a and 1b. At a point in time when the corresponding one of the processing units (i.e., the A-block processing unit 4a and the B-block processing unit 4b) completes reception of an output command, each of the dark test performing units 41a and 41b notifies the corresponding one of the output units 24a and 24b of an OFF output command. Also, each of the dark test performing units 41a and 41b monitors the corresponding one of the output units 24a and 24b, and if an OFF output signal is not issued even though the dark test performing unit 41a (or the dark test performing unit 41b) has output an OFF output instruction or if an ON output signal is not issued even though the comparing unit 22a (or the comparing unit 22b) has notified the corresponding one of the output units 24a 24b of an ON output instruction, the dark test performing unit 41a (or the dark test performing unit 41b) notifies the corresponding one of the abnormality processing units 33a and 33b of the situation where the OFF output signal or the ON output signal is not properly issued.

Next, an operation performed by the safety control device according to the third embodiment of the present invention will be explained. An operation performed by the safety control device when the judgment result of the command judging unit 21a included in the A-block processing unit 4a and the judgment result of the command judging unit 21b included in the B-block processing unit 4b both indicate that the command is an ON command will be explained, with reference to the sequence diagram in FIG. 12.

Figure 12:
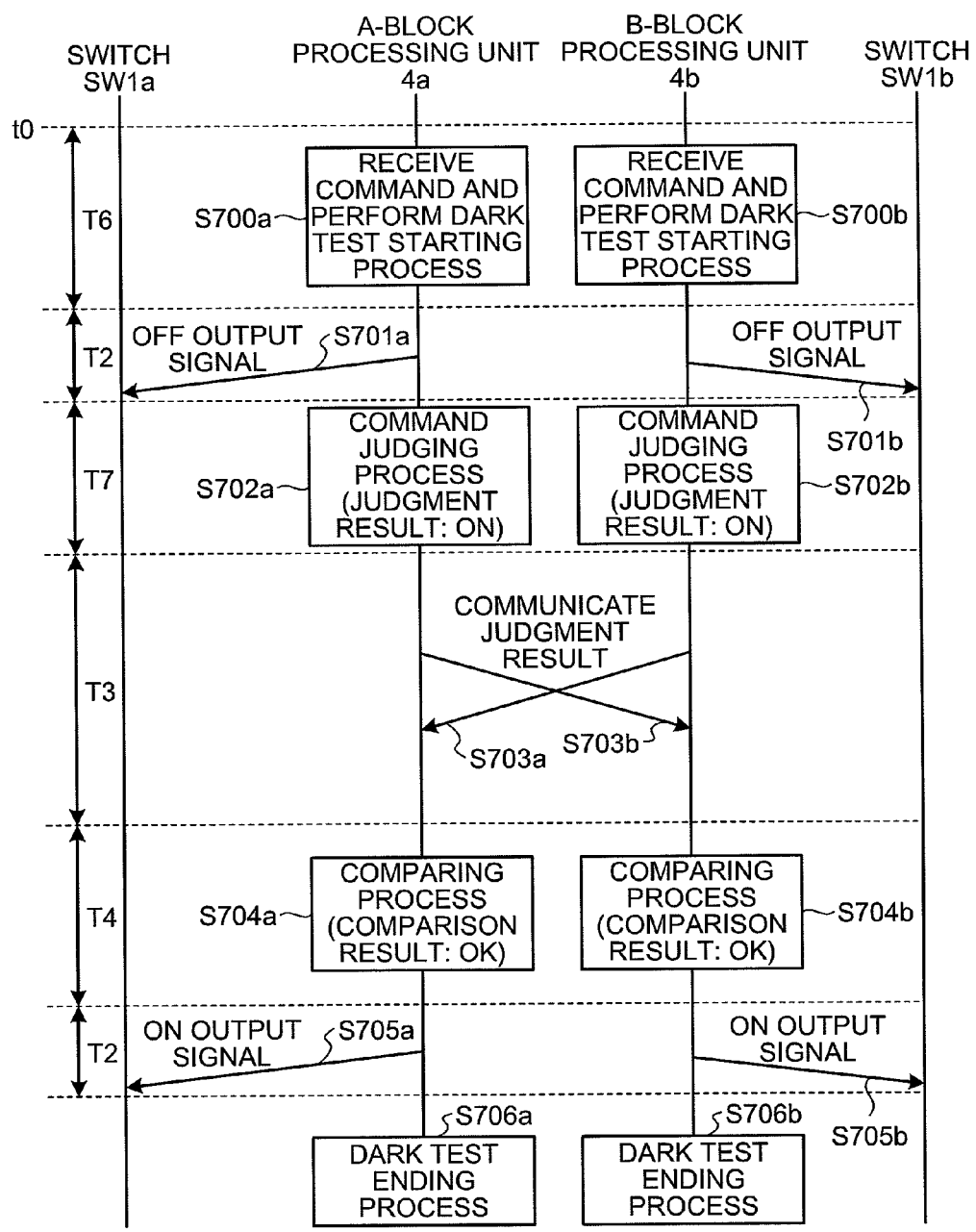
FIG. 12 is a sequence diagram for explaining an operation performed by the safety control device according to the third embodiment.

In FIG. 12, when each of the command judging units 21a and 21b has received an output command from the corresponding one of the command receiving units 1a and 1b and has completed the receiving process, a dark test starting process is performed (steps S700a and S700b). In other words, each of the dark test performing units 41a and 41b starts monitoring the corresponding one of the output units 24a and 24b and also notifies the corresponding one of the output units 24a and 24b of an OFF output instruction.

After that, each of the output units 24a and 24b outputs an OFF output signal to the corresponding one of the switches SW1a and SW1b (steps S701a and S701b). Each of the dark test performing units 41a and 41b judges whether the OFF output signal has been properly output from the corresponding one of the output units 24a and 24b. If the dark test performing unit 41a (or the dark test performing unit 41b) judges that the OFF output signal has not been properly output, the dark test performing unit 41a (or the dark test performing unit 41b) notifies the corresponding one of the abnormality processing units 33a and 33b, so that the abnormality process is performed.

Subsequently, the same operations as those at steps S503a through S505a and at steps S503b through S505b according to the second embodiment are performed at steps S702a through S704a and at steps S702b through S704b, respectively.

After that, each of the comparing units 22a and 22b notifies the corresponding one of the output units 24a and 24b of an ON output instruction, so that each of the output units 24a and 24b outputs an ON output signal to the corresponding one of the switches SW1a and SW1b (steps S705a and S705b). Each of the dark test performing units 41a and 41b judges whether the ON output signal has been properly output. If the dark test performing unit 41a (or the dark test performing unit 41b) judges that the ON output signal has not been properly output, the dark test performing unit 41a (or the dark test performing unit 41b) notifies the corresponding one of the abnormality processing units 33a and 33b, so that the abnormality process is performed. If the ON output signal has been properly output, each of the dark test performing units 41a and 41b performs the dark test ending process to end the process of monitoring the corresponding one of the output units 24a and 24b (steps S706a and S706b).

As explained above, by outputting the OFF output signal immediately after the A-block processing unit 4a and the B-block processing unit 4b each completes the process of receiving the output command, the safety control device turns off the switches SW1a and SW1b at the time that is later than the time t0 by the sum of a time period T6 required to receive the output command and complete the dark test starting process and the time period T2 required to output the OFF output signal. Further, after having received the output command, the safety control device outputs the ON output signal with the same timing as the first embodiment, so as to turn on the switches SW1a and SW1b. Furthermore, the safety control device uses the OFF output signal and the ON output signal as the test signals for the dark test and when one of the test signals is not properly output, performs the abnormality process.

Figure 13:
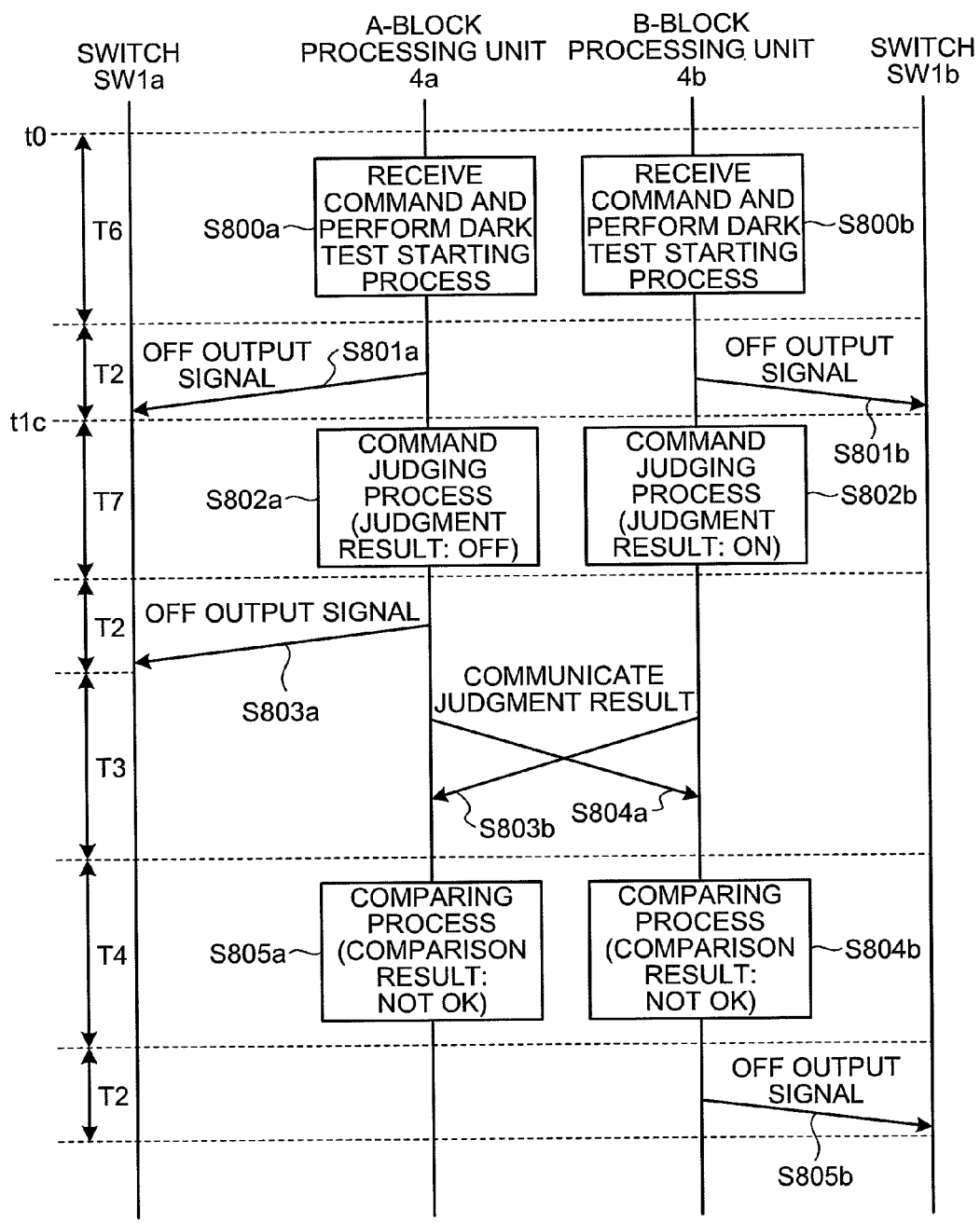
FIG. 13 is a sequence diagram for explaining another operation performed by the safety control device according to the third embodiment.

Next, an operation performed by the safety control device when the judgment result of the command judging unit 21a in the A-block processing unit 4a is different from the judgment result of the command judging unit 21b in the B-block processing unit 4b will be explained, with reference to the sequence diagram in FIG. 13. FIG. 13 is a sequence diagram for explaining an operation performed by the safety control device when the judgment result of the command judging unit 21a in the A-block processing unit 4a is "OFF" and the judgment result of the command judging unit 21b in the B-block processing unit 4b is "ON".

In FIG. 13, when each of the command judging units 21a and 21b receives an output command from the corresponding one of the command receiving units 1a and 1b and completes the receiving process, a dark test starting process is performed (steps S800a and S800b). In other words, each of the dark test performing units 41a and 41b starts monitoring the corresponding one of the output units 24a and 24b and also notifies the corresponding one of the output units 24a and 24b of an OFF output instruction.

After that, each of the output units 24a and 24b outputs an OFF output signal to the corresponding one of the switches SW1a and SW1b (steps S801a and S801b). Each of the dark test performing units 41a and 41b judges whether the OFF output signal has been properly output from the corresponding one of the output units 24a and 24b. If the dark test performing unit 41a (or the dark test performing unit 41b) judges that the OFF output signal has not been output properly, the dark test performing unit 41a (or the dark test performing unit 41b) notifies the corresponding one of the abnormality processing units 33a and 33b, so that the abnormality process is performed.

Subsequently, the same operations as those at steps S603a through S606a and at steps S603b through S606b according to the second embodiment are performed at steps S802a through S805a and at steps S802b through S805b, respectively.

If attention is directed to the outputting of the OFF output signals, each of the A-block processing unit 4a and the B-block processing unit 4b outputs the OFF output signal as a test signal for the dark test at the corresponding one of steps S801a and S801b. After that, at step S803a, the A-block processing unit 4a outputs the OFF output signal to the switch SW1a, based on the judgment result of the command judging unit 21a having judged that the command is an OFF command. After that, at step S805b, the B-block processing unit 4b outputs the OFF output signal to the switch SW1b.

In other words, the safety control device has not output any ON output signal since outputting the OFF output signals at steps S801a and S801b. Consequently, the safety control device is able to exercise safety control with the use of the OFF output signals, by using the test signals for the dark test that is performed immediately after receiving the output command for which the judgment results of the two blocks do not agree with each other. A time "t1c" at which the switches SW1a and SW1b each receive the OFF output signal is later than the time t0 by the sum of the time period T6 required to receive the command and perform the dark test starting process and the time period T2 required to output the OFF output signal. The time period T6 required to receive the command and perform the dark test starting process is considered to be not significantly different from time period T1 required to receive the command and perform the command judging process of making a judgment on the received command, which has been explained in the first embodiment. Accordingly, the time t1c is approximately the same as the time t1. Consequently, the safety control device according to the third embodiment is able to shorten the response time to a degree that is substantially the same as that in the first embodiment.

Next, an operation performed by the safety control device when the judgment results of the command judging unit 21a included in the A-block processing unit 4a and the command judging unit 21b included in the B-block processing unit 4b both indicate that the command is an OFF command will be explained. In this situation also, the safety control device first outputs an OFF output signal by using a test signal for the dark test that is performed immediately before an output command is received. After that, based on the judgment results regarding the received output signal, the safety control device outputs an OFF output signal. In other words, in the same manner as in the situation explained above where an output command for which the judgment results of the two blocks do not agree with each other has been received, the safety control device exercises safety control at the time that is later than the start of the process of receiving the command by the sum of the time period T6 required to receive the command and perform the dark test starting process and the time period T2 required to output the OFF output signal.

As explained above, according to the third embodiment, the output signal to stop the power supply to the device 81a or the device 81b is output immediately after the output command is input. Accordingly, like in the first embodiment, it is possible to shorten the response time without having to use CPUs that have a higher performance for the purpose of increasing the speeds of the communication of the judgment results and the comparing processes. Further, the safety control device is configured so as to perform the dark test by using, as the test signals, the output signal to stop the power supply to the device 81a or 81b that is output immediately after the output command is input, as well as the ON output signal that is output if both of the judgment results regarding the output command that has been input indicate that the command is an ON command. Thus, it is possible to eliminate the trouble of performing a dark test separately.

Fourth Embodiment

Generally, in addition to the dark tests, each safety control device performs a malfunction diagnosis process to diagnose whether the safety control device itself is not broken (or does not have a malfunction). More specifically, before starting the malfunction diagnosis process, each safety control device cuts off the electric power supply to the target device by outputting an OFF output signal and subsequently performs the malfunction diagnosis process. If each safety control device has found no malfunction therein, the safety control device outputs an ON output signal and resumes the electric power supply to the target device. A safety control device according to a fourth embodiment of the present invention uses, as the test signals for the dark test, an OFF output signal that is output before a malfunction diagnosis process is performed as well as an ON output signal that is output after the malfunction diagnosis process is performed. In the following, the safety control device according to the fourth embodiment will be explained, with reference to FIGS. 14 to 16.

Figure 14:
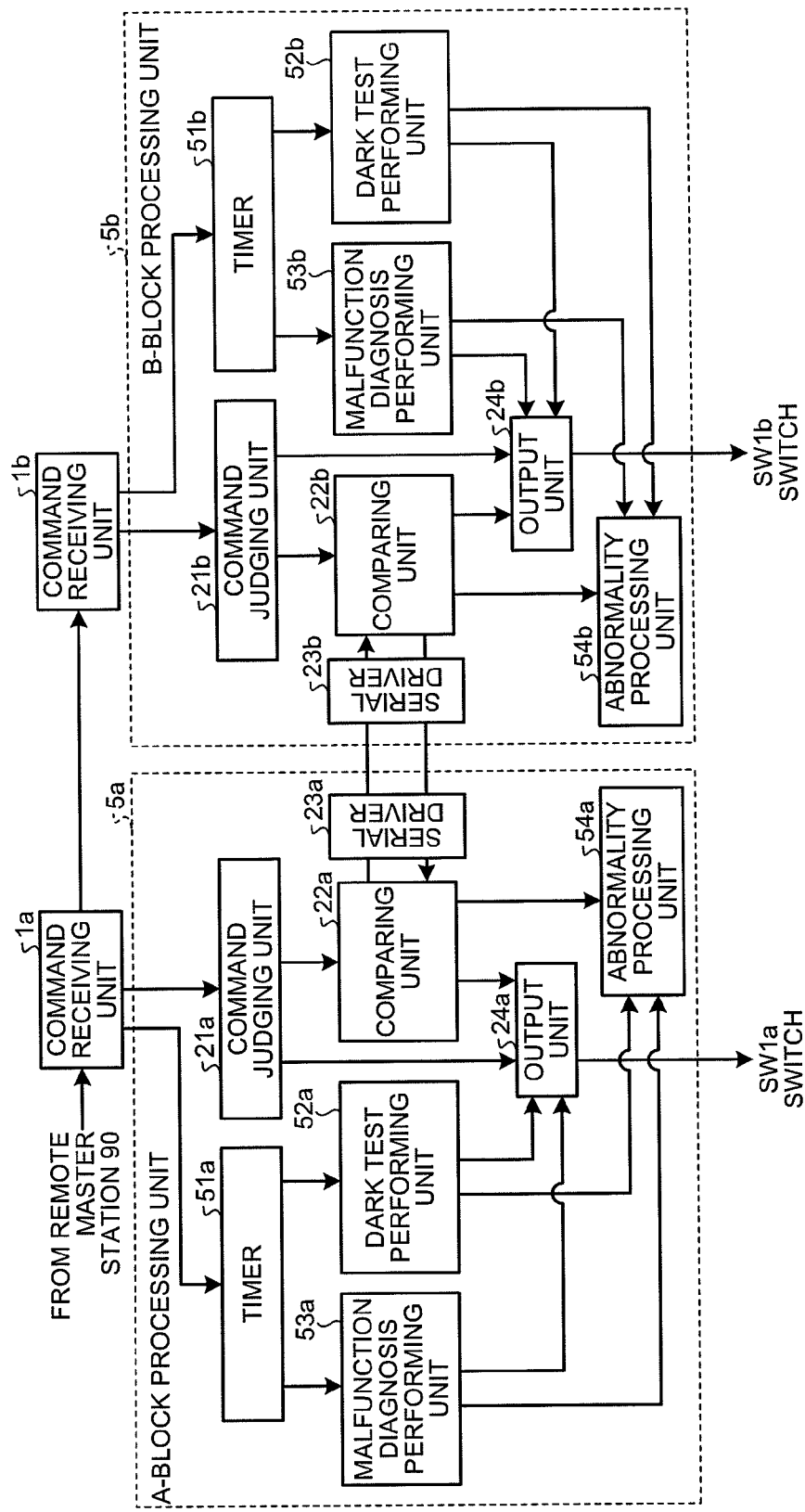
FIG. 14 is a block diagram of a safety control device according to a fourth embodiment of the present invention.
Figure 15:
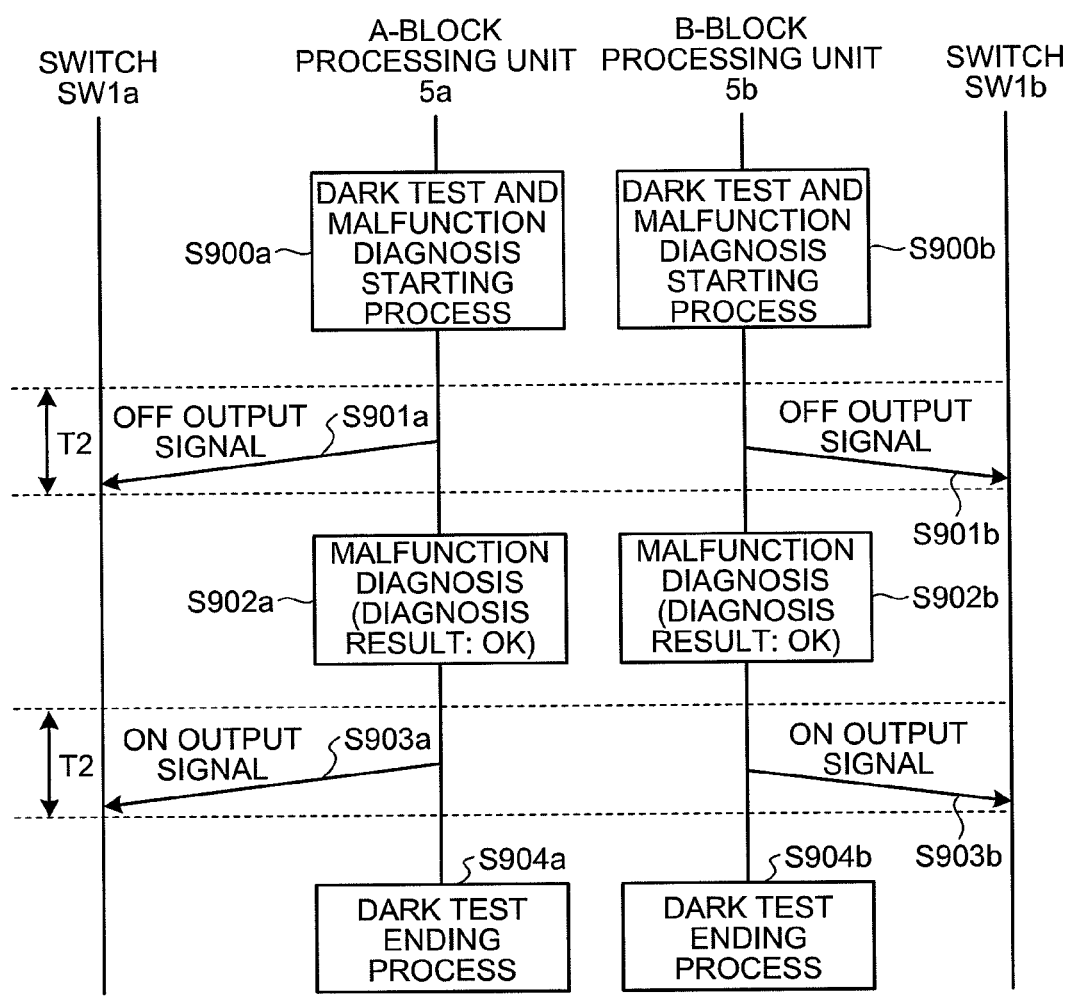
FIG. 15 is a sequence diagram for explaining an operation performed by the safety control device according to the fourth embodiment.

FIG. 14 is a block diagram of the safety control device according to the fourth embodiment. As shown in FIG. 14, the safety control device according to the fourth embodiment includes: the command receiving units 1a and 1b; an A-block processing unit 5a including the command judging unit 21a, the comparing unit 22a, the serial driver 23a, the output unit 24a, a timer 51a, a dark test performing unit 52a, a malfunction diagnosis performing unit 53a, and an abnormality processing unit 54a; and a B-block processing unit 5b including the command judging unit 21b, the comparing unit 22b, the serial driver 23b, the output unit 24b, the timer 51a, a dark test performing unit 52b, a malfunction diagnosis performing unit 53b, and an abnormality processing unit 54b.

Every time a predetermined time period elapses, each of the timers 51a and 51b notifies the corresponding one of the dark test performing units 52a and 52b of a dark test performing command and also notifies the corresponding one of the malfunction diagnosis performing units 53a and 53b of a malfunction diagnosis performing command instructing that a malfunction diagnosis process is to be performed.

Upon being notified of the dark test performing command by the corresponding one of the timers 51a and 51b, each of the dark test performing units 52a and 52b notifies the corresponding one of the output units 24a and 24b of an OFF output command. Also, each of the dark test performing units 52a and 52b monitors the corresponding one of the output units 24a and 24b, and if an OFF output signal is not issued even though the dark test performing unit 52a or 52b has output an OFF output instruction or if an ON output signal is not issued even though a malfunction diagnosis performing command unit (explained later) has executed an ON output instruction, the dark test performing unit 52a (or the dark test performing unit 52b) notifies the corresponding one of the abnormality processing units 54a and 54b that the OFF output signal or the ON output signal is not properly issued.

When having been notified of the malfunction diagnosis performing command by the corresponding one of the timers 51a and 51b, each of the malfunction diagnosis performing units 53a and 53b starts performing a malfunction diagnosis process on the electric power source (not shown) of the safety remote I/O station 82 and on the hardware (e.g., Micro Processing Units [MPUs] when the processing units are realized with the MPUs) with which the A-block processing unit 5a and the B-block processing unit 5b are realized. If no malfunction has been found as a result of the malfunction diagnosis process, each of the malfunction diagnosis performing units 53a and 53b notifies the corresponding one of the output units 24a and 24b of an ON output instruction. If the malfunction diagnosis performing unit 53a (or the malfunction diagnosis performing unit 53b) has found a malfunction, the malfunction diagnosis performing unit 53a (or the malfunction diagnosis performing unit 53b) notifies the corresponding one of the abnormality processing units 54a and 54b that the malfunction is present.

Upon being notified by the corresponding one of the dark test performing units 52a and 52b that the OFF output signal or the ON output signal has not been properly issued, each of the abnormality processing units 54a and 54b performs the abnormality process corresponding to the notification. Also, upon being notified by the corresponding one of the malfunction diagnosis performing units 53a and 53b that a malfunction is present, each of the abnormality processing units 54a and 54b performs the abnormality process corresponding to the notification.

Next, an operation performed by the safety control device according to the fourth embodiment of the present invention will be explained. An operation performed by the safety control device when each of the A-block processing unit 5a and the B-block processing unit 5b has performed a malfunction diagnosis process and has found no malfunction will be explained, with reference to the sequence diagram in FIG. 15.

First, a dark test and malfunction diagnosis starting process is performed (steps S900a and S900b). In other words, each of the timers 51a and 51b issues a dark test performing command and a malfunction diagnosis performing command. Upon being notified of the dark test performing command, each of the dark test performing units 52a and 52b notifies the corresponding one of the output units 24a and 24b of an OFF output instruction and starts monitoring the corresponding one of the output units 24a and 24b.

Subsequently, each of the output units 24a and 24b outputs an OFF output signal to the corresponding one of the switches SW1a and SW1b (steps S901a and S901b). Each of the dark test performing units 52a and 52b judges whether the OFF output signal has been properly output from the corresponding one of the output units 24a and 24b. If the dark test performing unit 52a (or the dark test performing unit 52b) judges that the OFF output signal has not properly been output, the dark test performing unit 52a (or the dark test performing unit 52b) notifies the corresponding one of the abnormality processing units 54a and 54b, so that the abnormality process is performed.

Subsequently, each of the malfunction diagnosis performing units 53a and 53b performs the malfunction diagnosis process and obtains a diagnosis result indicating that no malfunction has been found ("OK") (steps S902a and S902b).

After that, each of the malfunction diagnosis performing units 53a and 53b notifies the corresponding one of the output units 24a and 24b of an ON output instruction, so that each of the output units 24a and 24b outputs an ON output signal to the corresponding one of the switches SW1a and SW1b (steps S903a and S903b). Each of the dark test performing units 52a and 52b judges whether the ON output signal has been properly output. If the dark test performing unit 52a (or the dark test performing unit 52b) judges that the ON output signal has not properly been output, the dark test performing unit 52a (or the dark test performing unit 52b) notifies the corresponding one of the abnormality processing units 54a and 54b, so that the abnormality process is performed. If the ON output signal has been properly output, each of the dark test performing units 52a and 52b performs a dark test ending process to end the process of monitoring the corresponding one of the output units 24a and 24b (steps S904a and S904b).

Figure 16:
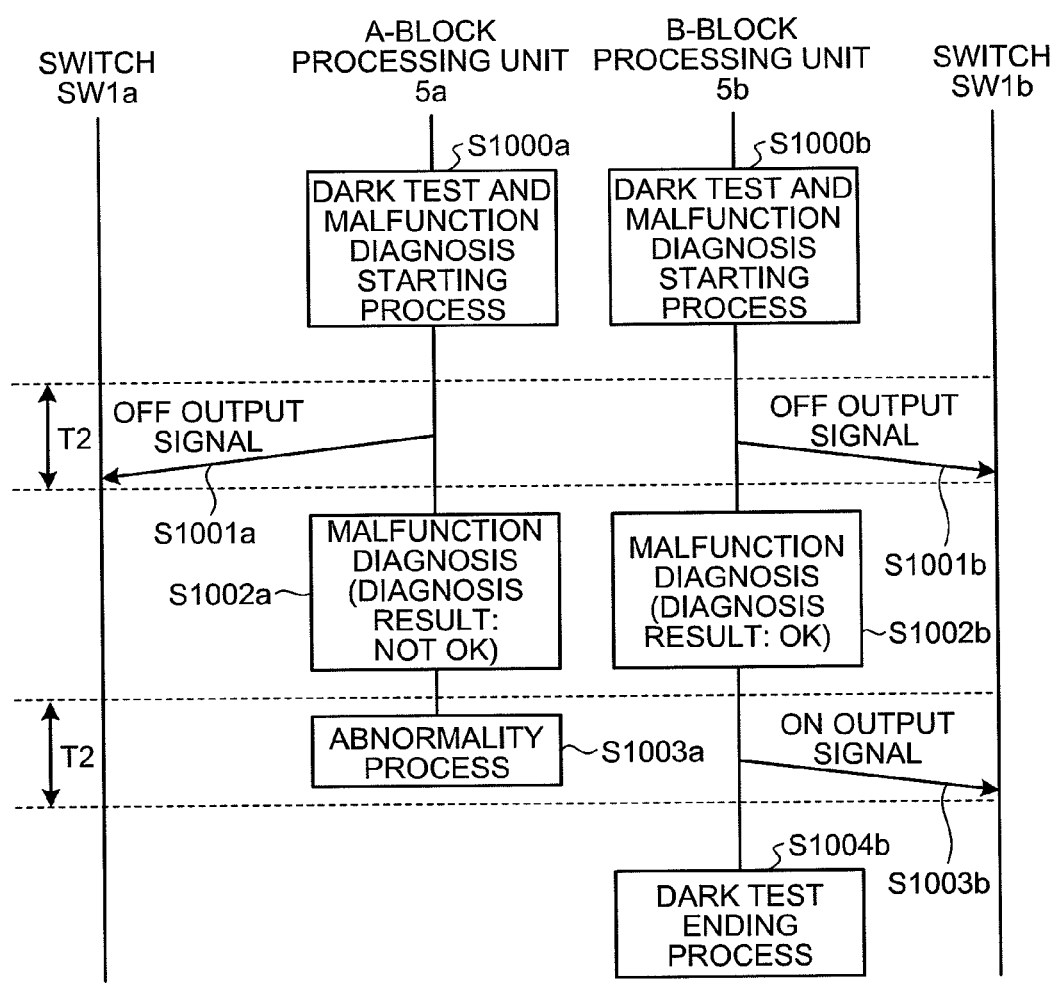
FIG. 16 is a sequence diagram for explaining another operation performed by the safety control device according to the fourth embodiment.

Next, an operation performed by the safety control device when each of the A-block processing unit 5a and the B-block processing unit 5b has performed a malfunction diagnosis process, and a malfunction has been found in one of the processing units will be explained. FIG. 16 is a sequence diagram for explaining an operation performed by the safety control device when a malfunction has been found in the A-block processing unit 5a and no malfunction has been found in the B-block processing unit 5b.

First, a dark test and malfunction diagnosis starting process is performed (steps S1000a and S1000b). Subsequently, each of the output units 24a and 24b outputs an OFF output signal to the corresponding one of the switches SW1a and SW1b (steps S1001a and S1001b). Each of the dark test performing units 52a and 52b judges whether the OFF output signal has been properly output from the corresponding one of the output units 24a and 24b. If the dark test performing unit 52a (or the dark test performing unit 52b) has judged that the OFF output signal has not been properly output, the dark test performing unit 52a or 52b notifies the corresponding one of the abnormality processing units 54a and 54b, so that the abnormality process is performed.

After that, each of the malfunction diagnosis performing units 53a and 53b performs the malfunction diagnosis process. The malfunction diagnosis performing unit 53a obtains a diagnosis result indicating that a malfunction has been found ("NOT OK") (step S1002a), and the malfunction diagnosis performing unit 53b obtains a diagnosis result indicating that no malfunction has been found ("OK") (step S1002b).

After that, the malfunction diagnosis performing unit 53a notifies the abnormality processing unit 54a so that the abnormality process is performed (step S1003a). The malfunction diagnosis performing unit 53b notifies the output unit 24b of an ON output instruction, so that the output unit 24b outputs an ON output signal to the switch SW1b (step S1003b). The dark test performing unit 52b judges whether the ON output signal has been properly output. If the dark test performing unit 52b has judged that the ON output signal has not been properly output, the dark test performing unit 52b notifies the abnormality processing unit 54b so that the abnormality process is performed. If the ON output signal has been properly output, the dark test performing unit 52b performs the dark test ending process to end the process of monitoring the output unit 24b (step S1004b).

Next, an operation performed by the safety control device when each of the A-block processing unit 5a and the B-block processing unit 5b has performed a malfunction diagnosis process, and the processing units in both of the blocks each have found a malfunction will be explained. In this situation also, each of the processing units in the two blocks performs the dark test and malfunction diagnosis starting process and outputs an OFF output signal. After that, like the A-block processing unit 5a in the example described above where a malfunction has been found in the A-block processing unit 5a while no malfunction has been found in the B-block processing unit 5b, each of the processing units in both of the blocks performs the abnormality process without outputting an ON output signal.

As explained above, according to the fourth embodiment, the safety control device uses, as the test signals for the dark test, the OFF output signal that is output before the malfunction diagnosis process is performed as well as the ON output signal that is output after the malfunction diagnosis process is performed. If no malfunction has been found in the malfunction diagnosis process, it is possible to perform, as it turns out, the malfunction diagnosis process and the dark test at the same time. If a malfunction has been found, it is possible to perform the abnormality process.

In the above-described second to fourth embodiments, for the purpose of enhancing the level of safety, the plurality of processing units are provided so that the judgment results regarding the output command are compared between the processing units; however, only one processing unit may be provided. If only one processing unit is provided, the output unit outputs an ON output signal or an OFF output signal based on a judgment result from the command judging unit, instead of the comparison result from the comparing unit.

INDUSTRIAL APPLICABILITY

As explained above, the safety control device according to an aspect of the present invention is useful as a safety control device including one or more processing units each of which exercises control over whether a target device is to be caused to perform a safety operation or to be permitted to operate, based on an output command that is input from the outside thereof. In particular, the safety control device according to an aspect of the present invention is suitable for a system that needs to shorten the response time between the time when the output command is received and the time when an output signal to cause the target device to perform the safety operation is output.

The invention claimed is:

1. A safety control device that judges whether to cause a target device to perform a safety operation or to permit the target device to operate, based on an output command that is input to the safety control device from outside and that controls an operation of the target device according to a result of the judgment, the safety control device comprising:

a processing unit that is configured to automatically output, before the judgment is performed, an output signal to stop supplying power to the target device based on the output command that is input to the safety control device, and to judge, after outputting the output signal, whether to cause the target device to perform the safety operation or to permit the target device to operate.

2. The safety control device according to claim 1, wherein the output command is input to the processing unit from the outside at predetermined time intervals, the processing unit comprises a timer unit that measures a time period that has elapsed from the input of the output command, and the processing unit outputs the output signal to stop the supplying of the power to the target device before the output command is input, based on the time period measured by the timer unit and the predetermined time intervals.

3. The safety control device according to claim 2, wherein the processing unit further comprises a dark test performing unit that diagnoses whether the safety control device is able to properly output signals, by monitoring the output signal to stop the supplying of the power to the target device, and an output signal to supply the power to the target device that is output based on the output command after the output signal to stop the supplying of the power is output.

4. The safety control device according to claim 2, further comprising a plurality of the processing units, wherein each of the processing units further comprises:

a command judging unit that judges whether the output command that has been input from the outside is an operation permitting command;

a comparing unit that transmits a judgment result of the command judging unit to another one of the plurality of processing units, receives a judgment result from the another one of the plurality of processing units, and compares the judgment result received from the another one of the plurality of processing units and the judgment result of the command judging unit to check whether the judgment results agree with each another; and an output unit that outputs the output signal to supply the power to the target device if the judgment result of the command judging unit is the operation permitting command and a comparison result of the comparing unit indicates agreement and that does not output the output signal to supply the power to the target device if the judgment result of the command judging unit is not the operation permitting command or if the comparison result of the comparing unit indicates disagreement.

5. The safety control device according to claim 1, wherein the processing unit outputs the output signal to stop the supplying of the power to the target device immediately after the output command is input.

6. The safety control device according to claim 5, wherein the processing unit further comprises a dark test performing unit that diagnoses whether the safety control device is able to properly output signals, by monitoring the output signal to stop the supplying of the power to the target device, and an output signal to supply the power to the target device that is output based on the output command after the output signal to stop the supplying of the power is output.

7. The safety control device according to claim 5, further comprising a plurality of the processing units, wherein each of the processing units further comprises:

a command judging unit that judges whether the output command that has been input from the outside is an operation permitting command;

a comparing unit that transmits a judgment result of the command judging unit to another one of the plurality of processing units, receives a judgment result from the another one of the plurality of processing units, and compares the judgment result received from the another one of the plurality of processing units and the judgment result of the command judging unit to check whether the judgment results agree with each another; and an output unit that outputs the output signal to supply the power to the target device if the judgment result of the command judging unit is the operation permitting command and a comparison result of the comparing unit indicates agreement and that does not output the output signal to supply the power to the target device if the judgment result of the command judging unit is not the operation permitting command or if the comparison result of the comparing unit indicates disagreement.

8. The safety control device according to claim 1, wherein the processing unit further includes:

a dark test performing unit that controls an output unit to output the output signal to stop the supplying of the power to the target device; and a malfunction diagnosis performing unit that performs a malfunction diagnosis on the safety control device after the output signal to stop the supplying of the power to the target device is output and that controls the output unit to output an output signal to supply the power to the target device if no malfunction has been found and performs an abnormality process if a malfunction has been found, wherein the dark test performing unit diagnoses whether the safety control device is able to properly output signals, by monitoring the output signal to stop the supplying of the power to the target device that the dark test performing unit controls the output unit to output and the output signal to supply the power to the target device that the malfunction diagnosis performing unit controls the output unit to output.

* * * * *